US012263630B2

(12) United States Patent
Hendrickson et al.

(10) Patent No.: US 12,263,630 B2
(45) Date of Patent: Apr. 1, 2025

(54) MOLDING SYSTEMS AND RELATED METHODS

(71) Applicant: Friendship Products LLC, Arlington, VA (US)

(72) Inventors: B. Everett Hendrickson, Los Angeles, CA (US); Craig Severn, Sharon (CA); Paul Mccutcheon, Georgetown (CA); Timothy Carlson, Arlington, VA (US)

(73) Assignee: Friendship Products, LLC, Arlington, VA (US)

( * ) Notice: Subject to any disclaimer, the term of this patent is extended or adjusted under 35 U.S.C. 154(b) by 0 days.

(21) Appl. No.: 17/989,207

(22) Filed: Nov. 17, 2022

(65) Prior Publication Data

US 2023/0081398 A1   Mar. 16, 2023

Related U.S. Application Data

(60) Division of application No. 17/325,020, filed on May 19, 2021, now Pat. No. 11,534,953, which is a
(Continued)

(51) Int. Cl.
*B29C 49/56*     (2006.01)
*B29B 13/02*     (2006.01)
(Continued)

(52) U.S. Cl.
CPC ............ *B29C 49/56* (2013.01); *B29C 35/045* (2013.01); *B29C 49/06* (2013.01); *B29C 49/063* (2013.01);
(Continued)

(58) Field of Classification Search
CPC .............. B29C 2049/701; B29C 45/56; B29C 49/4215; B29C 49/54; B29C 2049/542;
(Continued)

(56) References Cited

U.S. PATENT DOCUMENTS

| 3,949,034 A | 4/1976 | Uhlig |
| 4,075,187 A | 2/1978 | Olcott |

(Continued)

FOREIGN PATENT DOCUMENTS

| CN | 1192401 A | 9/1998 |
| CN | 1817619 A | 8/2006 |

(Continued)

OTHER PUBLICATIONS

Brazilian Patent Office, Technical Examination Report in related Brazilian Patent Application BR112019013012-8, Nov. 23, 2022, 10 pages.
(Continued)

*Primary Examiner* — John J DeRusso
*Assistant Examiner* — Alexander D Booth
(74) *Attorney, Agent, or Firm* — ROONEY IP, LLC

(57) ABSTRACT

A system for molding an object includes an articulated mold having an axis and a plurality of mold portions configured to collectively define a molding cavity for shaping the object when arranged in respective molding positions. The system includes a plurality of actuators, each operatively coupled to a respective mold portion and configured to move the respective mold portion along the axis from the respective molding position toward a respective ejecting position for releasing the object. The system includes a controller in communication with each of the plurality of actuators and configured to independently activate each of the plurality of actuators such that one of the plurality of mold portions moves along the axis from the respective molding position toward the respective ejecting position while at least one other of the plurality of mold portions remains stationary relative to the object in order to at least partially support the object.

10 Claims, 15 Drawing Sheets

Related U.S. Application Data continuation of application No. 15/863,401, filed on Jan. 5, 2018, now abandoned.

(60) Provisional application No. 62/442,984, filed on Jan. 6, 2017.

(51) Int. Cl.

| | | |
|---|---|---|
| *B29C 35/04* | (2006.01) | |
| *B29C 45/37* | (2006.01) | |
| *B29C 49/06* | (2006.01) | |
| *B29C 49/42* | (2006.01) | |
| *B29C 49/54* | (2006.01) | |
| *B29C 49/64* | (2006.01) | |
| *B29C 49/70* | (2006.01) | |
| *B29L 31/00* | (2006.01) | |
| *B29C 49/78* | (2006.01) | |
| *B29K 67/00* | (2006.01) | |
| *B29K 667/00* | (2006.01) | |

(52) U.S. Cl.
CPC ............ *B29C 49/54* (2013.01); *B29B 13/024* (2013.01); *B29C 45/372* (2013.01); *B29C 49/42122* (2022.05); *B29C 49/6409* (2013.01); *B29C 49/6436* (2013.01); *B29C 2049/701* (2013.01); *B29C 49/786* (2013.01); *B29K 2023/06* (2013.01); *B29K 2067/003* (2013.01); *B29K 2667/003* (2013.01); *B29K 2823/14* (2013.01); *B29L 2031/712* (2013.01); *B29L 2031/7158* (2013.01)

(58) Field of Classification Search
CPC .......... B29C 2049/548; B29C 49/6436; B29C 49/6445; B29C 49/70; B29C 2049/546; B29B 13/024

See application file for complete search history.

(56) References Cited

U.S. PATENT DOCUMENTS

| | | | |
|---|---|---|---|
| 4,140,468 A | 2/1979 | Duga | |
| 4,285,657 A | 8/1981 | Ryder | |
| 4,285,667 A | 8/1981 | Schmidt | |
| 4,595,449 A | 6/1986 | Nowicki | |
| 4,849,154 A | 7/1989 | Masumoto | |
| 4,883,633 A | 11/1989 | French | |
| 5,281,387 A | 1/1994 | Collette | |
| 5,445,515 A | 8/1995 | Orimoto | |
| 5,714,109 A | 2/1998 | Diller | |
| 5,750,067 A * | 5/1998 | Hellbrugge | B29C 49/54 264/516 |
| 6,383,440 B1 * | 5/2002 | Chen | B29C 49/50 264/529 |
| 7,553,156 B2 | 6/2009 | Doudement | |
| 9,290,300 B2 | 3/2016 | Hendrickson | |
| 9,346,585 B2 | 5/2016 | Hendrickson | |
| D794,466 S | 8/2017 | Hendrickson | |
| D794,467 S | 8/2017 | Hendrickson | |
| D806,553 S | 1/2018 | Hendrickson | |
| 2002/0180116 A1 * | 12/2002 | Weeks | B29C 49/56 425/527 |
| 2005/0160546 A1 | 7/2005 | Weihrauch | |
| 2006/0093699 A1 | 5/2006 | Arakelyan | |
| 2007/0085243 A1 | 4/2007 | Doudement | |
| 2008/0057286 A1 | 3/2008 | Polk | |
| 2008/0292738 A1 | 11/2008 | Cude | |
| 2011/0204067 A1 | 8/2011 | Schneider | |
| 2011/0236523 A1 * | 9/2011 | Ng | B29C 49/54 425/525 |
| 2011/0304076 A1 | 12/2011 | Halter | |
| 2013/0213846 A1 | 8/2013 | Hendrickson | |
| 2015/0130113 A1 * | 5/2015 | Galt | B29C 49/70 425/537 |
| 2016/0031148 A1 * | 2/2016 | Hendrickson | B29C 33/42 425/436 R |
| 2016/0229107 A1 | 8/2016 | Hendrickson | |
| 2017/0217634 A1 | 8/2017 | Hendrickson | |
| 2019/0091906 A1 | 3/2019 | Bopp | |

FOREIGN PATENT DOCUMENTS

| | | |
|---|---|---|
| CN | 101596781 A | 12/2009 |
| CN | 104736321 A | 6/2015 |
| CN | 104884231 A | 9/2015 |
| EP | 0593033 A1 | 4/1994 |
| EP | 0599099 A1 | 6/1994 |
| EP | 2233269 A1 | 9/2010 |
| EP | 2299299 A1 | 3/2011 |
| GB | 799304 A | 8/1958 |
| JP | S58203012 A | 11/1983 |
| JP | S6487323 A | 3/1989 |
| JP | H03246024 A | 11/1991 |
| JP | H04201430 A | 7/1992 |
| JP | H06285965 A | 10/1994 |
| JP | H06335959 A | 12/1994 |
| JP | 2000246793 A | 9/2000 |
| JP | 2005088413 A | 4/2005 |
| JP | 2006346875 A | 12/2006 |
| JP | 2012143906 A | 8/2012 |
| JP | 2013198999 A | 10/2013 |

OTHER PUBLICATIONS

Brazilian Patent Office, Technical Examination Report in related Brazilian Patent Application BR112019013012-8, Jun. 27, 2023, 3 pages.
Japanese Patent Office, Notice of Reasons for Rejection in JP Application No. 2022-126997, Sep. 4, 2023.
Brazilian Patent Office, Search Report in related Brazilian Patent Application BR112019013012-8, May 26, 2022, 9 pages.
Chinese Patent Office, Office Action, Chinese Patent Application 201880006130.2, Jan. 25, 2021.
Chinese Patent Office, Office Action, Chinese Patent Application 201880006130.2, Oct. 22, 2021.
European Patent Office, Examiner's Report, European Patent Application 18736166.2, Dec. 8, 2020.
European Patent Office, Supplementary European Search Report, European Patent Application 18736166.2, Nov. 28, 2019.
Indian Patent Office, Examiner's Report, Indian Patent Application 201917031607, Aug. 25, 2021.
Japanese Patent Office, Office Action, Japanese Patent Application 2019-557524, Jan. 4, 2021, 6 pages.
U.S. Patent and Trademark Office, International Search Report and Written Opinion in PCT/US18/12571, Apr. 13, 2018.
The International Bureau of WIPO, International Preliminary Report on Patentability in PCT/US18/12571, Jul. 9, 2019.
Friendship Products LLC, Interlocking Nesting Bottles, Brochure, undated, 4 pgs.
Canadian Patent Office, Office Action in Canadian Application No. 3,048,490, Jan. 4, 2024.
Chinese Patent Office, First Office Action, Chinese Patent Application 202210687067.1, Feb. 27, 2024.
Canadian Patent Office, Second Office Action in Canadian Application No. 3,048,490, Oct. 8, 2024.
Japanese Patent Office, Second Notice of Reasons for Rejection in JP Application No. 2022-126997, Jul. 1, 2024.
Mexican Patent Office, First Office Action in related Brazilian Patent Application No. MX/a/2019/008141, Apr. 19, 2024.

* cited by examiner

MOLDING SYSTEMS AND RELATED METHODS

CROSS REFERENCE TO RELATED APPLICATIONS

This application is a divisional of U.S. Utility patent application Ser. No. 17/325,020, filed May 19, 2021 which is a continuation of U.S. Utility patent application Ser. No. 15/863,401, filed Jan. 5, 2018, which claims the benefit of U.S. Provisional Patent Application Ser. No. 62/442,984, filed Jan. 6, 2017, the disclosures of each of which are hereby incorporated by reference in their entireties.

TECHNICAL FIELD

The present invention relates to devices, systems, and processes for manufacturing an article such as a plastic bottle or container using molding techniques, such as blow molding. More particularly, the present invention relates to devices, systems, and processes for manufacturing containers that are scalable, modular, and lockable laterally and vertically with other like containers.

BACKGROUND

Blow molding is a well-known technique that is used for manufacturing plastic articles such as bottles, containers, automobile parts, or cases. In a one-stage or "single-stage" blow molding machine, the process begins with manufacture at a first station of a hot, injection molded preform or "parison" of hollow plastic material, the preform further conditioned at a second station and then moved and positioned at a third station which has a mold cavity with interior walls in the shape of the final article to be molded. In a "two-stage" machine the preforms are manufactured externally, but transported to and reheated at a conditioning station before moving to the blow cavity.

Injection stretch blow molding (ISBM) is a term of art and refers mostly, if not entirely, to biaxial PET blow molding from preforms. ISBM techniques date back only about 35 years. Some blow-molded plastic bottles are blown from an extruded tube that the closing mold pinches off at the bottom end. ISBM is used to provide a plastic container or other useful article of manufacture created on a machine from a pre-form, which is first stretched in the axial direction, and then blown in a mold by high pressure air in the hoop direction. The hot preform may be manufactured via an injection mold station on a "one-stage" or "single-stage" stretch blow mold machine, whereafter the preform is temperature conditioned, and then stretch blow molded into a final article, and finally cooled on the same machine before ejection.

Materials used in blow molding to create plastic articles include polyethylene (PE) and polyethylene terephthalate (PET), due to their high level of thermoplasticity.

The typical sequence of operations in a single-stage ISBM machine is as follows. PET is delivered to the machine site, usually in small flake form contained in sizeable boxes ("gaylords"). Once the gaylord box is opened, the PET particles immediately begin absorbing excessive levels of moisture from the ambient air. Thus, virtually all single-stage ISBM machines run the PET material through a dryer. The material then enters a "manifold" meant to maintain PET heat and dryness during transport to the preform molding station, where the parison is formed by injecting liquefied PET material into a mold cavity, with parison thickness and its internal profile a function of the shape of the preform insertion rod lathed to specifications. Once cooled enough to transport, the molded preform moves to a conditioning station, where optimal (e.g., article-specific) pre-blow temperatures are achieved for the parison, both internally and on its exterior surface. The conditioned parison then moves to the blow station, where compressed air works with a stretch rod to expand the PET resin until contact with the mold cavity walls, at which point the PET resin quickly cools and hardens, after which the mold is opened to allow article ejection.

Manufacturers and other performers of molding techniques are continuously striving for improvements of such techniques. It would therefore be desirable to provide improved devices, systems, and processes for manufacturing an article using molding techniques.

SUMMARY

In one embodiment, a system for molding an object includes an articulated mold having an axis and including a plurality of mold portions configured to collectively define a molding cavity for shaping the object when arranged in respective molding positions. The system also includes a plurality of actuators, wherein each of the plurality of actuators is operatively coupled to a respective mold portion of the plurality of mold portions and configured to move the respective mold portion along the axis from the respective molding position toward a respective ejecting position for releasing the object. The system further includes a controller in communication with each of the plurality of actuators and configured to independently activate each of the plurality of actuators such that one of the plurality of mold portions moves along the axis from the respective molding position toward the respective ejecting position while at least one other of the plurality of mold portions remains stationary relative to the object in order to at least partially support the object. The molding cavity may include at least one of a tongue or a groove extending in a direction parallel to the axis. In addition or alternatively, the plurality of actuators may be configured to move the respective mold portions along the axis from the respective molding positions toward the respective ejecting positions in a same direction.

In one embodiment, the controller is configured to activate each of the plurality of actuators sequentially. For example, the plurality of mold portions may include a bottom portion and at least one side portion distributed along the axis, and the at least one side portion may be configured to move along the axis from the respective molding position toward the respective ejecting position prior to the bottom portion moving along the axis from the respective molding position toward the respective ejecting position such that the bottom portion supports the object during movement of the at least one side portion. In another embodiment, the plurality of mold portions may include an upper side portion and a lower side portion distributed along the axis, and the lower side portion may be configured to move along the axis from the respective molding position toward the respective ejecting position prior to the upper side portion moving along the axis from the respective molding position toward the respective ejecting position such that the upper side portion supports the object during movement of the lower side portion. In yet another embodiment, the plurality of mold portions may include first and second side-by-side portions distributed about the axis, and the first side-by-side portion may be configured to move along the axis from the respective molding position toward the respective ejecting position prior to the second side-by-side portion moving along the axis from the respective molding position toward the respective ejecting position such that the second side-by-side portion supports the object during movement of the first side-by-side portion.

In another embodiment, a method of releasing a molded object from a molding cavity defined by a plurality of mold portions of an articulated mold having an axis is provided. The method includes moving a first mold portion of the plurality of mold portions along the axis from a respective molding position toward a respective ejecting position, wherein during moving the first mold portion the object is supported by a second mold portion of the plurality of mold portions. The method further includes subsequently moving the second mold portion along the axis from a respective molding position toward a respective ejecting position. In one embodiment, moving the first mold portion includes activating a first actuator operatively coupled to the first mold portion. Moving the second mold portion may include activating a second actuator operatively coupled to the second mold portion.

In one embodiment, the first mold portion is arranged below the second mold portion along the axis when the first and second mold portions are in the respective molding positions. In another embodiment, the first mold portion is arranged above the second mold portion along the axis when the first and second mold portions are in the respective molding positions. In yet another embodiment, the first and second mold portions are arranged side-by-side about the axis when the first and second mold portions are in the respective molding positions.

In another embodiment, a method of manufacturing an object in an articulated mold having an axis is provided. The method includes arranging a plurality of mold portions of the articulated mold into respective molding positions to define a molding cavity and molding the object in the molding cavity. The method also includes moving a first mold portion of the plurality of mold portions along the axis from the respective molding position toward a respective ejecting position, wherein during moving the first mold portion the object is supported by a second mold portion of the plurality of mold portions. The method further includes subsequently moving the second mold portion along the axis from a respective molding position toward a respective ejecting position. In one embodiment, moving the first mold portion includes activating a first actuator operatively coupled to the first mold portion. Moving the second mold portion may include activating a second actuator operatively coupled to the second mold portion.

In one embodiment, the first mold portion is arranged below the second mold portion along the axis when the first and second mold portions are in the respective molding positions. In another embodiment, the first mold portion is arranged above the second mold portion along the axis when the first and second mold portions are in the respective molding positions. In another embodiment, the first and second mold portions are arranged side-by-side about the axis when the first and second mold portions are in the respective molding positions.

The step of molding the object may include blow molding the object from a preform. For example, blow molding the object may include stretch blow molding the object from the preform. The method may further include conditioning the preform prior to blow molding, wherein conditioning the preform includes positioning the preform in a heating cavity and forcing a heated gas into the heating cavity onto an exterior surface of the preform. Conditioning the preform may further include positioning a nozzle having at least one sidewall within the heating cavity to at least partially surround the preform. The at least one sidewall may include at least one aperture, and forcing the heated gas into the heating cavity may include directing the heated gas through the at least one aperture. For example, directing the heated gas through the at least one aperture may include directing the heated gas to a predetermined portion of the exterior surface of the preform.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

While the exemplary embodiments are described below for use in a stretch blow molding procedure, it will be understood by those skilled in the art that the embodiments described herein could be used in other molding or die casting applications, including but not limited to extrusion blow molding, injection molding, or tumble molding.

As used herein, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The embodiments of the invention include systems, devices, and processes for manufacturing a scalable, modular, interconnective, and interlocking container with multipurpose uses and applications such as that described in U.S. patent application Ser. No. 14/777,210 ("the '210 application"), filed Sep. 15, 2015, the disclosure of which is incorporated by reference in its entirety. An exemplary first use of such a container is for transporting and/or storing flowable materials such as liquids or pourable solids. An exemplary second use of such a container is for a creative modeling element or for a sturdy, low cost, easily assembled building block material of a standardized nature. The embodiments can be used for building housing, storage, or other practical structures, including applications employed for disaster relief, humanitarian development projects, for military or defense purposes, and for other practical and modeling purposes. The embodiments include systems, devices, and processes for manufacturing a single container that is interlocked to other modular containers of the same or different sizes. Each modular container slide-locks with other containers to form strong wall and building structures that can be filled with liquids such as water, natural earth, sand, or other natural or processed materials, thereby forming a sturdy structure without need of mortar, and can adapt to uneven base surfaces typically found in natural terrain.

Figure 1:
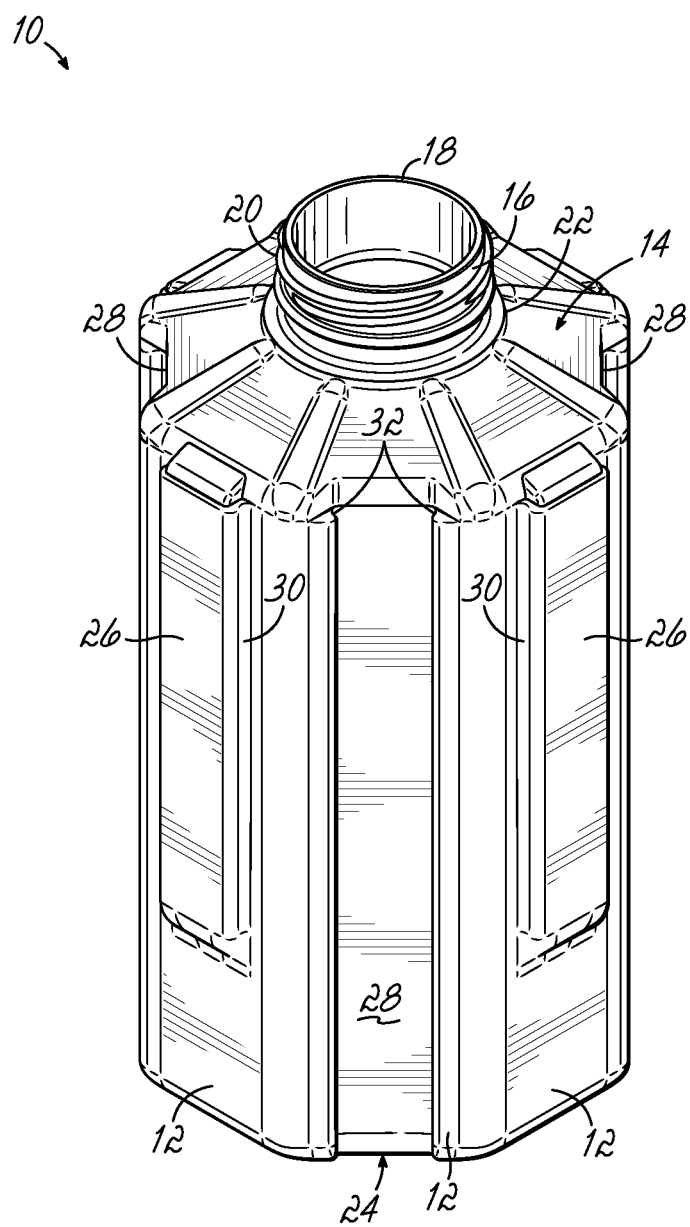
FIG. 1 is a perspective view of a modular interlocking container manufactured in accordance with an embodiment of the invention.

Referring now to FIG. 1, an exemplary scalable, modular interconnecting container 10 is a hollow or partially hollow element that may be constructed of plastic, metal, resin, or composites. For example, in certain embodiments, the container is made of PE, PET and/or other thermoplastic material. Alternatively, the container 10 may be constructed of any rigid material that is appropriately high-strength and capable of providing sufficient stackable and connectable rigidity. The container 10 includes a plurality of upright walls 12. In the embodiment illustrated in FIG. 1, the container 10 is shown with eight longitudinal walls 12 of equal or varying height which form a generally octagonal latitudinal cross-section. In other embodiments, the container 10 may be formed with differently shaped latitudinal cross-sections, such as circular, ovoid, polygonal, triangular, square, rectangular, or hexagonal shapes, for example. In any event, the container 10 may be configured to hold a liquid, solid, and/or gas and may also be configured for use as a modeling or building element with or without any internal contents.

As shown, the container 10 includes a top end section 14 which includes a neck 16 terminating at an aperture 18 for filling the container 10 with any gas, fluid, granular, flake, or other material. In one embodiment, the container 10 may be manufactured with an airtight or pressure-resistant seal or cap (not shown). The neck 16 is configured to couple with such a cap via threads 20 provided on the neck 16 for sealing the contents within the container 10. Alternatively, the neck 16 may be configured to couple with a cap via a snap-fit mechanism, or any other suitable type of connection for forming an appropriate seal to prevent the contents of the container 10 from leaking out thereof and/or to prevent foreign objects from entering the container 10. With an appropriate seal formed between the neck 16 and the cap, the container 10 may be made fluid-tight for holding and transporting liquids (e.g., water, juice, cooking oil), or could form an appropriate seal for granulated or powdered goods (e.g., grains, seeds, flour, flakes), household materials (e.g., soap, cleaners), or construction materials (e.g., cement, grout, sand). As shown, a ring 22 is formed near the base of the neck 16 and may provide a seat for a tamper evident ring (not shown) that may be positioned between the base of the neck 16 and the threads 20, as may be desired.

The illustrated container 10 includes a bottom end section 24 including a vertical interconnection receptor 25 (FIG. 4) formed as an indent therein having a cross dimension sized to receive a closure cap and ring 22 from a similar, second container 10. The receptor 25 may have a limiting edge with a cross dimension sized to engage with the ring 22 during vertical interconnection with the similar second container 10 to provide a stop therewith.

In the embodiment shown, the container 10 provides a mechanism for lateral connection with other containers 10 in a slidable, interlocking manner. For example, lateral connection of multiple containers 10 may be enabled by tongues 26 and grooves 28 distributed in multiple locations laterally on or within the walls 12 of the container 10. In this regard, each tongue 26 is configured as a raised, flat and/or slightly rounded protrusion formed on or within a respective wall 12. Each groove 28 is indented into a respective wall 12 and configured to receive a corresponding tongue 26 from a second container 10 having similar connectivity features. In one embodiment, the tongues 26 and grooves 28 are formed along the walls 12 in a generally perpendicular orientation to the top and bottom sections 14, 24. As shown, the tongues 26 and grooves 28 may be positioned in alternating locations around the container 10, wherein a tongue 26 is positioned on every alternating wall 12 with a groove 28 positioned on every wall 12 therebetween. Alternatively, one or more tongues 26 could be formed on one or more of the walls 12 and one or more grooves 28 could be formed on the remaining walls 12. In other embodiments, a container 10 may have only grooves 28 on its respective side walls 12 while other containers 10 may have only tongues 26 formed in their respective side walls 12. Regardless of the distribution patterns, separate containers 10 can be interlocked with each other via the tongues 26 and grooves 28.

To that end, an interlocking mechanism is provided using undercuts 30 of each tongue 26 that may be received into corresponding expanded cuts 32 of each groove of a similar, second container 10. Together with their respective tongues 26 and/or grooves 28, the undercuts 30 and/or expanded cuts 32 may be referred to as "dovetails." The undercuts 30 are formed such that each tongue 26 interfaces with the respective wall 12 with a narrower base than the width of the tongue 26 at its outermost portion. Similarly, the width of each groove 28 including the respective expanded cuts 32 is greater than the width of each groove 28 excluding the respective expanded cuts 32 such that when two containers 10 are connected via longitudinal sliding of a tongue 26 into a corresponding groove 28, the width of the outer edges of the tongue 26 lock laterally behind each respective expanded cut 32. It will be appreciated that each container 10 may include any number of tongues 26 and/or grooves 28 in order to interconnect, as may be desired. In one embodiment, the configuration of the container, including any of the tongues 26, grooves 28, undercuts 30, and/or expanded cuts 32 may be similar to those described in the '210 application.

Figure 2:
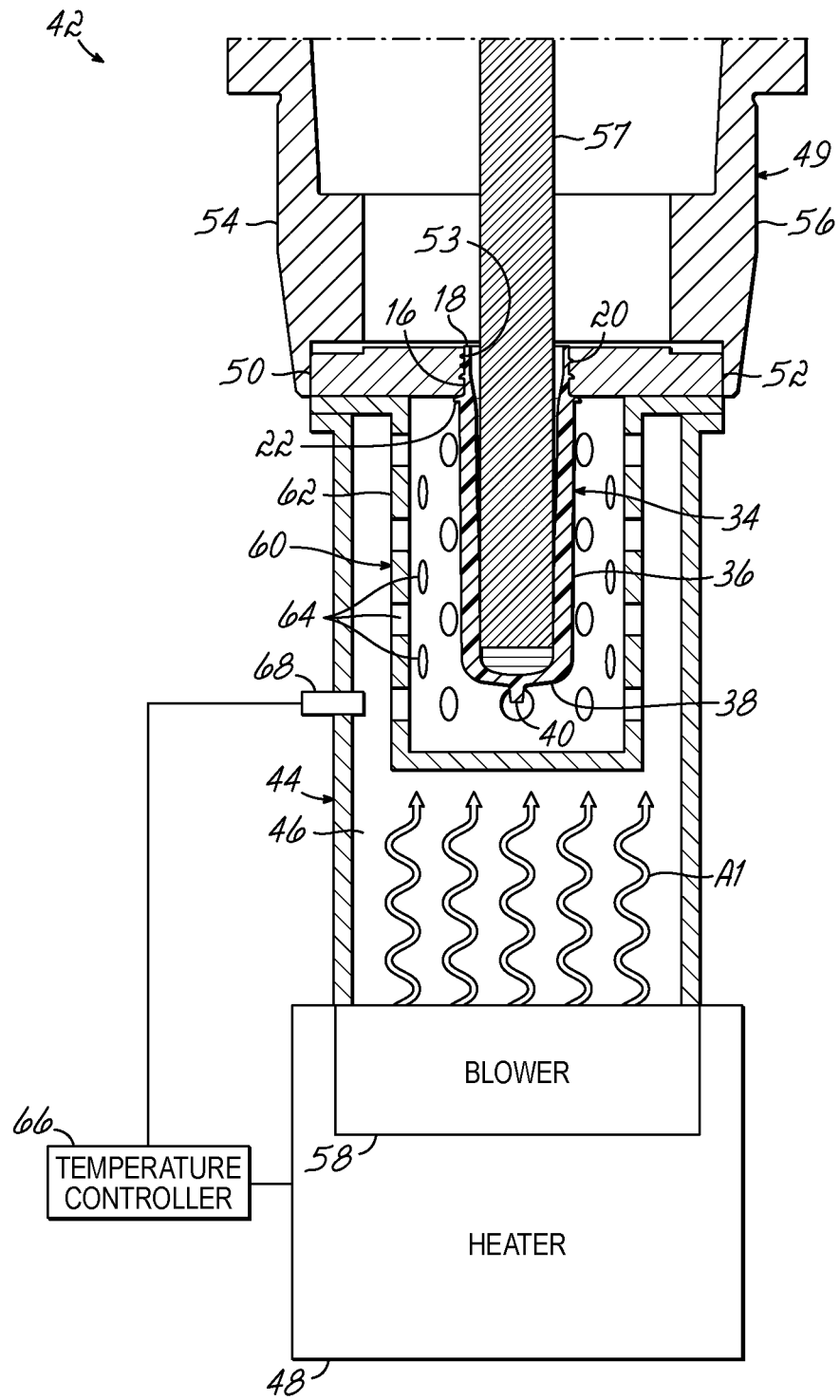
FIG. 2 is a cross sectional view of a heating station, showing heated air directed therein during a conditioning operation, in accordance with an embodiment of the invention.

Referring now to FIG. 2, a preform 34 may be used to form the container 10. The preform 34 may be similar to that described in the '210 application. For example, the preform 34 may be formed via injection blow molding in a preform mold cavity (not shown) as a closed-end cylindrical article generally similar in shape to a test-tube. As shown, the preform 34 is initially formed with the neck 16, opening 18, threads 20, and ring 22 of the final container 10, along with a generally cylindrical body 36. As described in greater detail below, during the stretch blow mold process, the cylindrical body 36 may be expanded to conform to the interior walls of a mold, while the neck 16 may remain substantially the same in shape, size, and configuration. In the embodiment shown, the cylindrical body 36 terminates at a closed end 38 which includes include a protruding tip 40 that is an artifact of the injection process. The thicknesses of the cylindrical body 36 and/or closed end 38 may vary by design or by artifact. For example, the closed end 38 may have a greater thickness than that of the cylindrical body 36 in order to facilitate plastic flow into a lower portion of a mold, as described in greater detail below.

In any event, the preform 34 may be subjected to an ISBM technique, such as a hot parison technique, wherein after formation the preform 34 is immediately transferred to a conditioning station where the potential heat within the preform 34 gained during the injection mold process can be utilized and fine-tuned for ISBM operation to produce the container 10. In this regard, the distribution of heat in the hot closed-end preform 34 may significantly influence the wall thickness and plastic flow of the final blown container 10. Thus, irregularity in temperature of the preform 34 can cause defects in the final blown container 10. For example, such irregularities may lead to undesirably thin walls of a portion of the container 10 and/or the inability of the material to properly flow in a mold due to cooling and hardening of the material. This may be particularly problematic for molds having complex geometries such as deep and/or narrow crevasses into which the material is desired to flow in order to form features such as the dovetails of the container 10.

With continuing reference to FIG. 2, in one embodiment, an exemplary conditioning or heating station 42 for heating the exterior surface of the preform 34 is provided that overcomes certain problems or shortcomings of conventional preform heating stations, particularly when used to manufacture articles having complex geometries such as the dovetails of the interlocking container 10. For example, it will be appreciated that conventional preform heating stations are typically not capable of heating the exterior of the preform 34 to sufficiently high temperatures needed to blow the preform 34 into a mold having complex geometries to form features such as the dovetails of the container 10. Conventional preform heating stations are also not able to precisely measure the heat and are not able to precisely adjust the heat transferred to the exterior of the preform 34 from the heating station. In addition, conventional preform heating stations are not able to heat the exterior of the preform 34 evenly and not able to direct heat to specific areas on the exterior of the preform 34 where more material flow is desired in the next stage of the blow mold process.

The exemplary heating station 42 is capable of meeting the challenges present in making the container 10 with the dovetails and which are not typically present in manufacturing conventional articles such as conventional containers. In this regard, the container 10 may be particularly sensitive to the heating temperature, and it may be desirable to provide a very high heat to the exterior of the preform 34 in the preform heating stage in order to allow the material to flow into the dovetails and/or vertical interconnector receptor 25. The difference in wall thickness from one side of the container 10 to the other may impact the strength of the dovetail connections and therefore impact function significantly. The difference in wall thickness from the top of the container 10 to the bottom of the container 10 may impact the strength of Container 10 and therefore impact stability of the container 10. For example, weaknesses in the wall thickness may lead to blowouts during blow molding. The features and characteristics of the container 10 vary significantly from top to bottom and side to side, such as due to the dovetails and vertical receptor.

The exemplary heating station 42 is configured to heat the exterior of the preform 34 in preparation for blow molding. More particularly, the heating station 42 includes a manifold 44 defining a heating cavity 46 for receiving the preform 34 and a heater 48 in thermal communication with the heating cavity 46 and configured to heat a suitable gas, such as air. In one embodiment, the heating station 42 may further include a carrying apparatus 49 configured to securely grip the neck 16 of the preform 34 external to the heating cavity 46 with the cylindrical body 36 of the preform 34 positioned within the heating cavity 46. In this regard, the carrying apparatus 49 includes first and second arms 50, 52 each having grooves or threads 53 for mating with the threads 20 of the neck 16 when the neck 16 is clamped between the first and second arms 50, 52. As shown, the first and second arms 50, 52 are carried by first and second supports 54, 56, respectively. As discussed in greater detail below, the arms 50, 52 and/or supports 54, 56 may be movable in order to grip, release, and/or transport the preform 34 between the heating station 42 and other stations for performing the blow molding procedure. A core rod 57 may extend from the carrying apparatus 49 down into the interior of the preform 34 to support the preform 34. In one embodiment, the core rod 57 may assist in heating and/or maintaining the temperature of the preform 34. For example, the core rod 57 may be heated to approximately 60° C. In one embodiment, the core rod 57 may only be inserted into the preform 34 during a portion of the time period when the preform 34 is conditioned at the preform heating station 42. For example, the core rod 57 may be inserted into the preform 34 for approximately 3 seconds, while the cylindrical body 36 of the preform 34 may be positioned within the heating cavity 46 for approximately 10 seconds.

The heating station 42 further includes a blower 58 configured to force the gas heated by the heater 48 into the heating cavity 46, as indicated by the arrows A1, and onto the exterior of the preform 34. Thus, the heating station 42 uses forced hot air to heat the exterior of the preform 34 in the heating cavity 46, unlike conventional heating or conditioning stations that typically utilize radiant heat. By forcing hot air onto the exterior of the preform 34, the exemplary heating station 42 allows for heating the exterior of the preform 34 faster and more thoroughly than the conventional radiant heating method. The heating station 42 may also provide the capability to heat the exterior of the preform 34 to a higher temperature in a shorter amount of time in comparison to the conventional radiant heating method. In one embodiment, the temperature of the hot air in the heating cavity 46 at or near the exterior of the preform 34 may be between approximately 200° C. and approximately 600° C. For example, the temperature of the hot air may be between approximately 285° C. and approximately 315° C. In one embodiment, the temperature of the hot air may be approximately 300° C. In addition or alternatively, the heating station 42 may be configured to expose the preform 34 to the hot forced air for approximately 10 seconds. Such a 10 second period may be substantially the entire period during which the cylindrical body 36 of the preform 34 is within the heating chamber 46. In one embodiment, the pressure of the hot air blown onto the exterior of the preform 34 may be approximately 20 PSI. A portion of hot air may escape between the neck 16 of the preform 34 and the arms 50, 52.

In one embodiment, the exemplary heating station 42 may be configured to direct forced, hot air to specific points on the exterior of the preform 34, unlike the conventional heating stations wherein the radiant heat is not capable of targeting specific areas that may require increased heating to allow effective blow molding. In this regard, temperature differentials in the mold wall(s) may undesirably cool certain portions of the blown preform prior to others unless counteracted by increased heating of the preform 34 at corresponding locations. Similarly, the dovetails formed as the preform 34 is blown may cool faster as a result of protruding beyond the inner wall of the mold and interfacing with a relatively thin outer wall of the mold. In certain embodiments, the closed end 38 of the preform 34 may be required to flow farther than the cylindrical body 36 of the preform 34 in order to flow into the dovetails at the bottom of the mold, but may cool prior to filling the dovetails due to contact with the bottom wall of the mold. Thus, it may be desirable to target heat to specific areas of the exterior of the preform 34 to prevent premature cooling of such areas in the mold and to maintain the preform 34 in an appropriate temperature-regulated plasticized state prior to stretch blow Molding.

To that end, the illustrated heating station 42 includes a nozzle 60 including a cylindrical sidewall or shell 62 and positioned within the heating cavity 46 to at least partially surround the preform 34. The nozzle 60 provides for targeted heating of specific areas on the exterior of the preform 34. In this regard, the sidewall 62 of the nozzle 60 includes a plurality of apertures, such as bores 64, for directing gas therethrough. For example, hot forced air may be directed through the bores 64 in the sidewall 62 by the blower 58 to predetermined areas or portions of the exterior of the preform 34 where increased heating is desired. In one embodiment, the bores 64 may have a cross dimension, such as a diameter, of between approximately 0.200 inch and approximately 0.205 inch. While generally circular bores 64 are shown, apertures of other embodiments may include slots, curves, funnels, or any suitable type and/or shape of aperture capable of directing the forced hot air to a specific or targeted area of the exterior of the preform 34 inside of the heating cavity 46. The nozzle 60 may partially or fully surround the preform 34 in the heating cavity 46 and may direct hot air to a portion of the preform 34 at any desirable location on the exterior of the preform 34. In addition or alternatively, the bores 64 may be adjustable, such as in position, cross dimensional size and/or shape. For example, the bores 64 may be opened and closed, moved, or redirected in order to direct hot air toward areas on the exterior of the preform 34 where more heat is desired and/or direct hot air away from areas on the exterior of the preform 34 where less heat is desired to accomplish desired flow results in the next blow stage.

In one embodiment, the bores 64 are arranged in a uniform pattern on the sidewall 62 of the nozzle 60 to provide an even heat distribution around the nozzle 60. The bores 64 may be arranged in a pattern that minimizes total temperature differences and maximizes uniformity. In this regard, the pattern of the bores 64 may be altered from that illustrated in order to encourage the forced air flow to move in such a way as to smooth out any temperature gradients. In another embodiment, the bores 64 may be arranged to provide a differential application of heat around the circumference of the nozzle. The particular locations of the bores 64 may correspond to the locations of various geometrical features on the blown container 10, such as the dovetails.

The nozzle 60 may be configured to provide clearance between the preform 34 and the sidewall 62 of the nozzle 60 when the preform 34 is inserted into the heating cavity 46 and at least partially surrounded by the nozzle 60. For example, the outer diameter of the cylindrical body 36 of the preform 34 may be approximately 24 mm and the inner diameter of the cylindrical sidewall 62 of the nozzle 60 may be approximately 34.5 mm, thereby providing a clearance of approximately 5.25 mm between the preform 34 and the sidewall 62.

Thus, the heating station 42 may precisely direct more heat toward areas on the exterior of the preform 34 where additional flow is desired in the next blow stage of the blow mold procedure and precisely avoid heating those areas on the exterior of the preform 34 where additional flow in the next blow stage of the blow mold procedure is not desired.

It will be appreciated that the containers 10 and/or preform 34 may require being heated to a significantly higher temperature than conventional containers. In some embodiments, the temperatures desired in the blow molding process may reach the limits of what the preform 34 can be heated to without beginning to melt or otherwise deform in the heating station 42. For example, the temperature of the hot air forced onto the exterior of the preform 34 may approach the melting temperature of the material of the preform 34. Such deformation could prevent the container 10 from being properly blow molded. Therefore, it may be desirable to be able to precisely, by very small increments, increase the temperature of the air being blown on the exterior of the preform 34 to the point where the desired flow of material in the blow molding process is achieved without deforming the preform 34.

To that end, the heating station 42 may be configured to precisely adjust as well as measure the temperature of the hot air being forced onto the exterior of the preform 34. In this regard, the heating station 42 includes a temperature controller 66 in communication with the heater 48 and a temperature gauge 68 in communication with the temperature controller 66. The temperature controller 66 is configured to adjust the output of the heater 48, and thereby the temperature of the air forced onto the exterior of the preform 34, and the temperature gauge 68 is configured to measure the temperature of the hot air being blown onto the exterior of the preform 34. For example, the temperature gauge 68 may be positioned in the heating cavity 46 proximate the exterior of the preform 34 in order to precisely measure the temperature of the air blown thereon. In one embodiment, the temperature gauge 68 may be positioned within the nozzle 60. In any event, the temperature gauge 68 may be configured to send a signal to the temperature controller 66 indicative of the temperature measurement, which the temperature controller 66 may use to determine a proper output of the heater 48 and adjust the output of the heater 48 accordingly. In this manner, the temperature controller 66 and temperature gauge 68 may provide precise measurement of the temperature of the air being blown on the exterior of the preform 34, and precise adjustment of the temperature of the air being blown on targeted or specific areas of the exterior of the preform 34.

Turning now to FIGS. 3-9, in one embodiment, an exemplary blow mold station 70 for molding a finished article such as the container 10 from the preform 34 is provided that overcomes various problems and/or shortcomings of conventional blow molding stations. As discussed in greater detail below, the blow mold station 70 is configured to mold the preform 34 into the finished shape of the container 10, including the dovetails. The blow mold station 70 meets the various challenges present in making the container 10 that may not typically be present in making conventional articles such as conventional containers. In this regard, conventional articles such as conventional containers are typically extracted from a mold in an injection stretch blow mold machine via a clamshell opening process. The container 10 may not be suitable for extraction from a mold via a clamshell opening process due to the undercuts 30 and expanded cuts 32 of the dovetails, for example. In one embodiment, the exemplary blow mold station 70 may be capable of extracting various interlocking articles that include deeper undercuts 30 and expanded cuts 32 on the tongues 26 and grooves 28 than those described in the '210 application.

In one embodiment, the exemplary blow mold station 70 may be used in conjunction with the exemplary heating station 42 so that during the blow mold process, material flows to a better degree into the deeper crevasses of the dovetails. For example, the heating station 42 may be configured as a separate apparatus that can be modified to attach onto, and become operationally integrated with, the blow mold station 70. In other words, the heating station 42 may be operationally synchronized with the process of the blow mold station 70 to heat a preform 34 prior to the preform 34 being automatically moved to the blow mold station 70 to be blow molded. Such modularity may enable upgrading existing blow mold stations 70, for example.

It will be appreciated that various challenges and difficulties in the demolding process may be present, such as when manufacturing the container 10 after subjecting the associated preform 34 to the exemplary preform heating station 42. For example, due to the heating processes at the preform heating station 42 successfully assisting material to flow into and/or around the dovetail portions during the blowing step, the containers 10 may be "grabbed" more strongly by the at least a portion of the mold as the mold is lowered to remove the container 10 following the blow stage due to the static friction between the container 10 and the mold. As a result, the container 10 may be undesirably deformed or destroyed while being extracted from the mold. Such deformations may include areas on or around the neck 16 of the container 10 that may become stretched as a result of the neck 16 being held firmly in place while the walls 12 of the container 10 may be pulled down by the withdrawing mold or mold portion due to the static friction therebetween. The resulting tension may stretch the neck 16 rendering the container 10 unusable and/or tearing the container 10 into separate pieces. As discussed below, the exemplary blow mold station 70 may be configured to address one or more of these issues.

Figure 3:
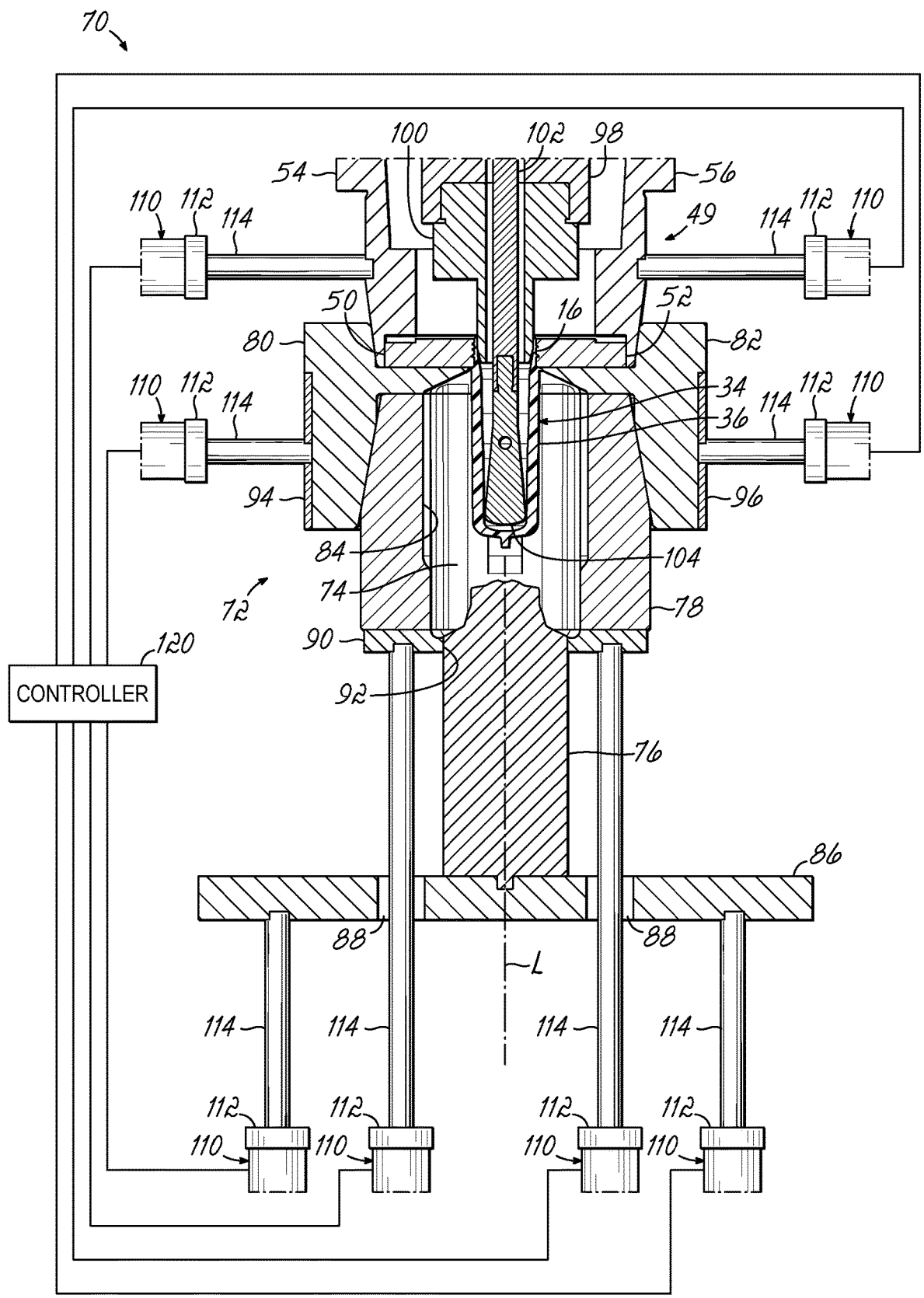
FIG. 3 is a cross sectional view of a molding station, showing mold portions of an articulated mold in respective molding positions in accordance with an embodiment of the invention.

In the embodiment shown, the blow mold station 70 includes an articulated mold 72 having a plurality of mold portions configured to collectively define a molding cavity 74 for molding the preform 34 into a finished article such as the container 10 when arranged in respective molding positions (FIG. 3). More particularly, the illustrated articulated mold 72 includes a bottom mold portion 76, a generally cup-shaped side mold portion 78, and first and second top mold portions 80, 82. The articulated mold 72 has a longitudinal axis L along which the bottom mold portion 76, side mold portion 78, and top mold portions 80, 82 are distributed. In the embodiment shown, the side mold portion 78 includes at least one dovetail 84 including a tongue or a groove extending in a direction parallel to the axis L for forming a corresponding dovetail on the container 10.

As shown, the bottom mold portion 76 is mounted at a bottom end thereof to a bottom mold platform 86 having a pair of apertures 88 extending therethrough, the purposes of which are discussed below. The side mold portion 78 is mounted at a bottom end thereof to a side mold platform 90 having a generally central aperture 92 through which the bottom mold portion 76 extends. In the embodiment shown, the side mold platform 90 may itself provide a molding surface for the container 10. The first and second top mold portions 80, 82 are mounted at outer sides thereof to first and second top mold platforms 94, 96, respectively. In certain embodiments, any of the mold portions 76, 78, 80, 82 may be integrally formed with their respective platforms 86, 90, 94, 96 as unitary pieces.

In the illustrated blow mold station 70, the carrying apparatus 49 previously described with respect to the heating station 42 is configured to securely grip the neck 16 of the preform 34 external to the molding cavity 74 with the cylindrical body 36 of the preform 34 positioned within the molding cavity 74. In this regard, the carrying apparatus 49 may be configured to move (e.g., rotate and/or translate) from the heating station 42 to the blow mold station 70 in order to automatically transport the preform 34 from the heating cavity 46 to the molding cavity 74. In this manner, the heating station 42 may be integrated with the blow mold station 70. In another embodiment, the blow mold station 70 may include a dedicated carrying apparatus (not shown).

Figure 4:
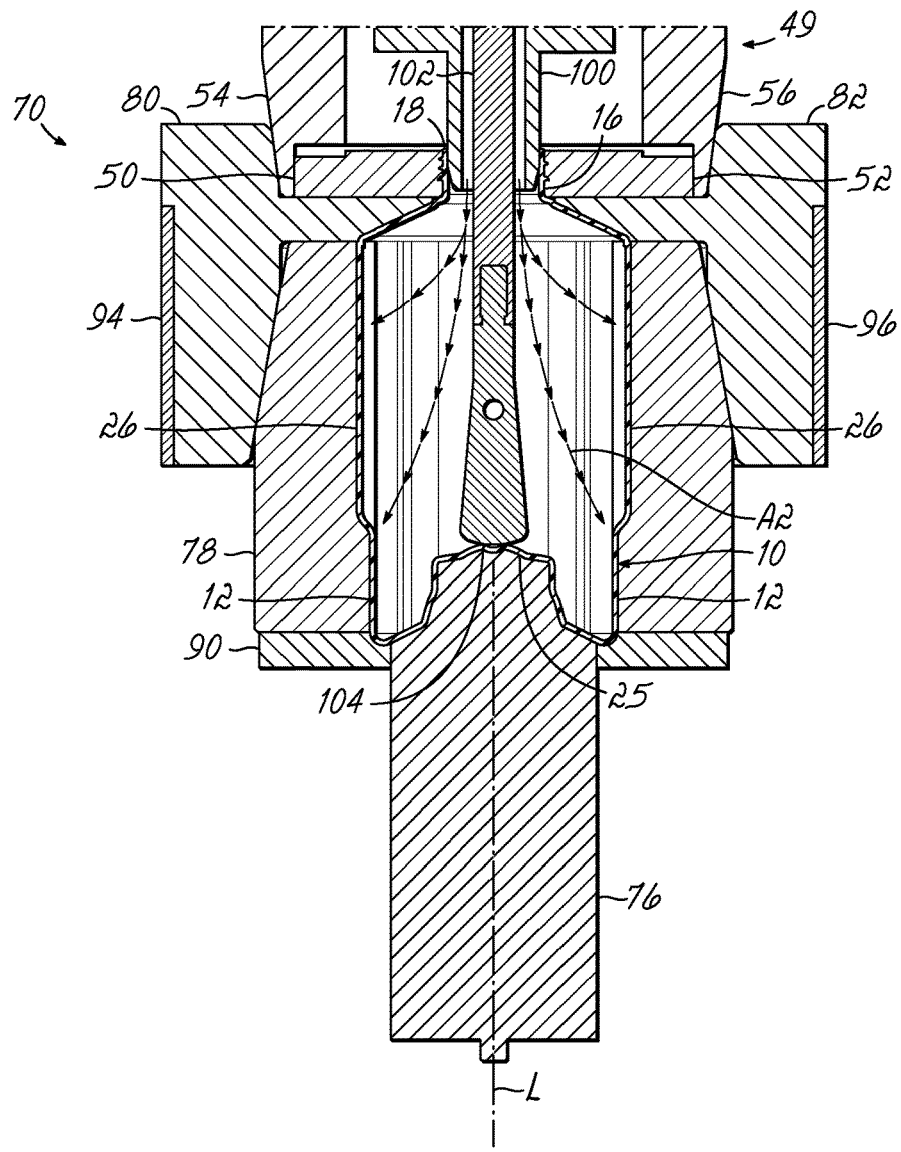
FIG. 4 is a partial cross sectional view of the molding station of FIG. 3, showing pressurized gas directed therein during a blow molding operation.

In any event, the blow mold station 70 also includes a compressed gas conduit 98 and nozzle 100 configured to at least partially extend into the neck 16 of the preform 34 for directing compressed gas, such as air, into the preform 34 for blow molding the preform 34 into the final shape of the container 10, as indicated by the arrows A2 (FIG. 4). A stretch rod 102 terminating at a stretch rod tip 104 extends through the conduit 98 and nozzle 100, and is configured to lower the stretch rod tip 104 into the preform 34 in order to stretch the preform 34 into the molding cavity 74. In one embodiment, the preform 34 may be stretched by the stretch rod 102 and/or stretch rod tip 104 into the molding cavity 74 to the bottom mold portion 76 (whereat the protruding tip 40 may interact with the bottom mold portion 76 to assist in centering the preform 34 in the molding cavity 74) and may be subjected to pressurized gas directed to the interior of the preform 34 via the compressed gas conduit 98 and nozzle 100. For example, the pressure of the gas directed into the interior of the preform 34 may be approximately 585 PSI. In one embodiment, the stretching of the preform 34 by the stretch rod 102 and/or stretch rod tip 104 and the blowing of the preform 34 by the compressed gas may occur substantially Simultaneously.

After blow molding the container 10, the exemplary blow mold station 70 is configured to provide effective and efficient demolding of the finished container 10 with a minimal risk of damage to the container 10, including the neck 16 and the dovetails including the tongues 26 and grooves 28. In the embodiment shown, each of the mold portions 76, 78, 80, 82 and arms 50, 52 are independently movable. More particularly, the bottom and side mold portions 76, 78 are independently movable along the axis L, and the top mold portions 80, 82 and arms 50, 52 are independently movable radially relative to the axis L. In this regard, the blow mold station 70 includes a plurality of actuators, such as hydraulic actuators 110, each operatively coupled to a respective mold portion 76, 78, 80, 82 or arm 50, 52. Each illustrated actuator 110 includes a cylinder 112 and a piston 114 expandable from and/or retractable into the respective cylinder 112 and coupled to one of the platforms 86, 90, 94, 96 or arms 50, 52 at a distal end thereof. In the embodiment shown, the pistons 114 coupled to the side mold platform 90 extend through the apertures 88 of the bottom mold platform 86 in order to reach the side mold platform 90. While hydraulic actuators 110 are shown, it will be appreciated that any suitable actuators, such as pneumatic actuators or translation screw actuators, may be used.

Figure 5:
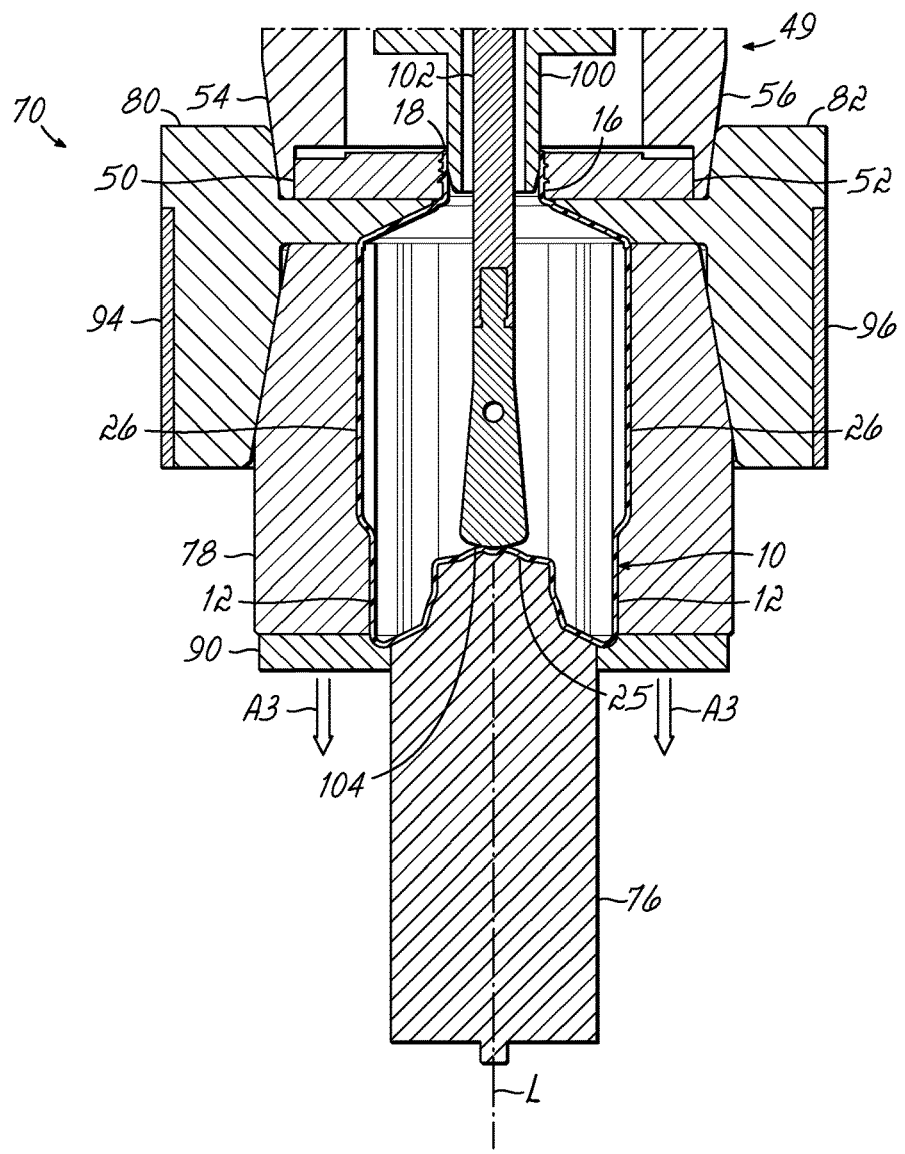
FIG. 5 is a partial cross sectional view of the molding station of FIG. 3, showing a side mold portion being retracted during a demolding operation.
Figure 6:
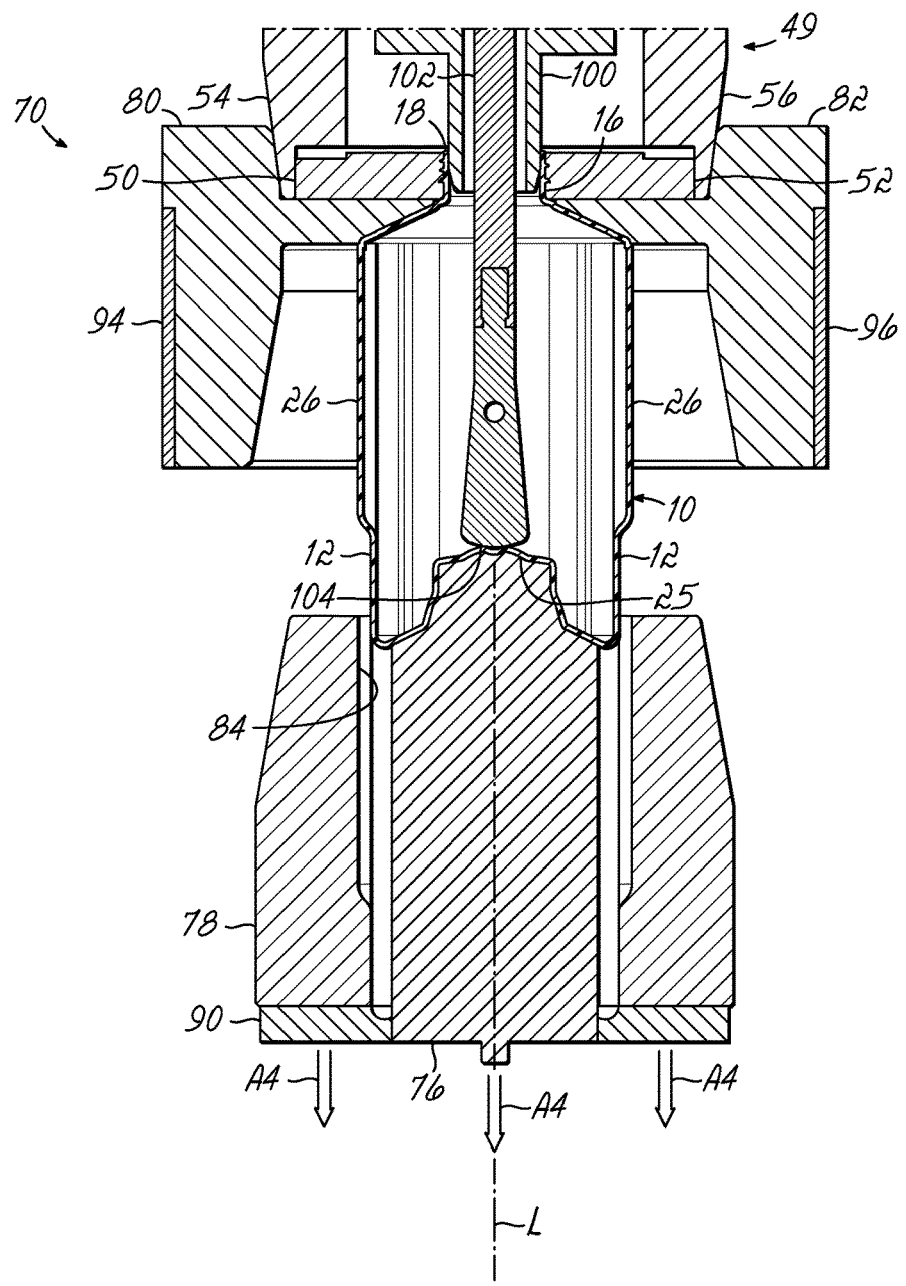
FIG. 6 is a view similar to FIG. 5, showing a bottom mold portion and the side mold portion being retracted during the demolding operation.

The blow mold station 70 includes a controller 120 in communication with each of the actuators 110 and configured to independently activate each of the actuators 110 to retract the respective mold portions 76, 78, 80, 82 and arms 50, 52 during the demolding process and, more particularly, to "pull down" the bottom and side portions 76, 78 independently during the demolding process. In this regard, the controller 120 may be configured to activate the actuators 110 of each of the platforms 86, 90, 94, 96 and/or supports 54, 56 sequentially. For example, the controller 120 may initially activate the actuators 110 of the side mold portion 78 to retract the respective pistons 114 in order to move the side mold portion 78 downward along the axis L from the respective molding position toward a respective ejecting position, as indicated by the arrows A3 (FIG. 5). As the side mold portion 78 moves toward the respective ejecting position, the inner surface of the aperture 92 of the side mold platform 90 may traverse along an outer surface of the bottom mold portion 76. The controller 120 may subsequently activate the actuators 110 of the bottom mold portion 76 to retract the respective pistons 114 in order to move the bottom mold portion 76 downward along the axis L from the respective molding position toward a respective ejecting position (FIG. 6). In the embodiment shown, the controller 120 is configured to activate the actuators 110 of the bottom mold portion 76 when the side mold platform 90 contacts or is in near contact with the bottom mold platform 86. In this manner, the bottom and side mold portions 76, 78 may move together toward the respective ejecting positions when the side mold platform 90 reaches the bottom mold platform 86, as indicated by the arrows A4. Alternatively, the bottom mold portion 76 may begin to move toward the respective ejecting position substantially immediately after the side mold portion 78 begins moving and overcomes the static friction with the container 10.

The bottom mold portion 76 may thus provide support to the blown container 10 for a predetermined amount of time at least until the static friction is overcome between the container 10 and the side mold portion 78. Once the static friction is overcome and the side mold portion 78 is moving down, any friction between the container 10 and the side mold portion 78 is kinetic. Such kinetic friction may be lower than the static friction previously present between the container 10 and the side mold portion 78. More particularly, this kinetic friction may be sufficiently low such that the bottom mold portion 76 may be moved down without causing the container 10 to stretch beyond normal limits associated with damage or rupture.

In other words, after the static friction between the container 10 and side mold portion 78 is overcome, the kinetic friction between the container 10 and the moving side mold portion 78 may be insufficient to deform or destroy the container 10. The support from the bottom mold portion 76 may assist in preventing the container 10 from stretching beyond its limit and/or being broken apart during the demolding process. In this manner, the side mold portion 78 may begin the demolding process before the bottom mold portion 76 is pulled down.

Figure 7:
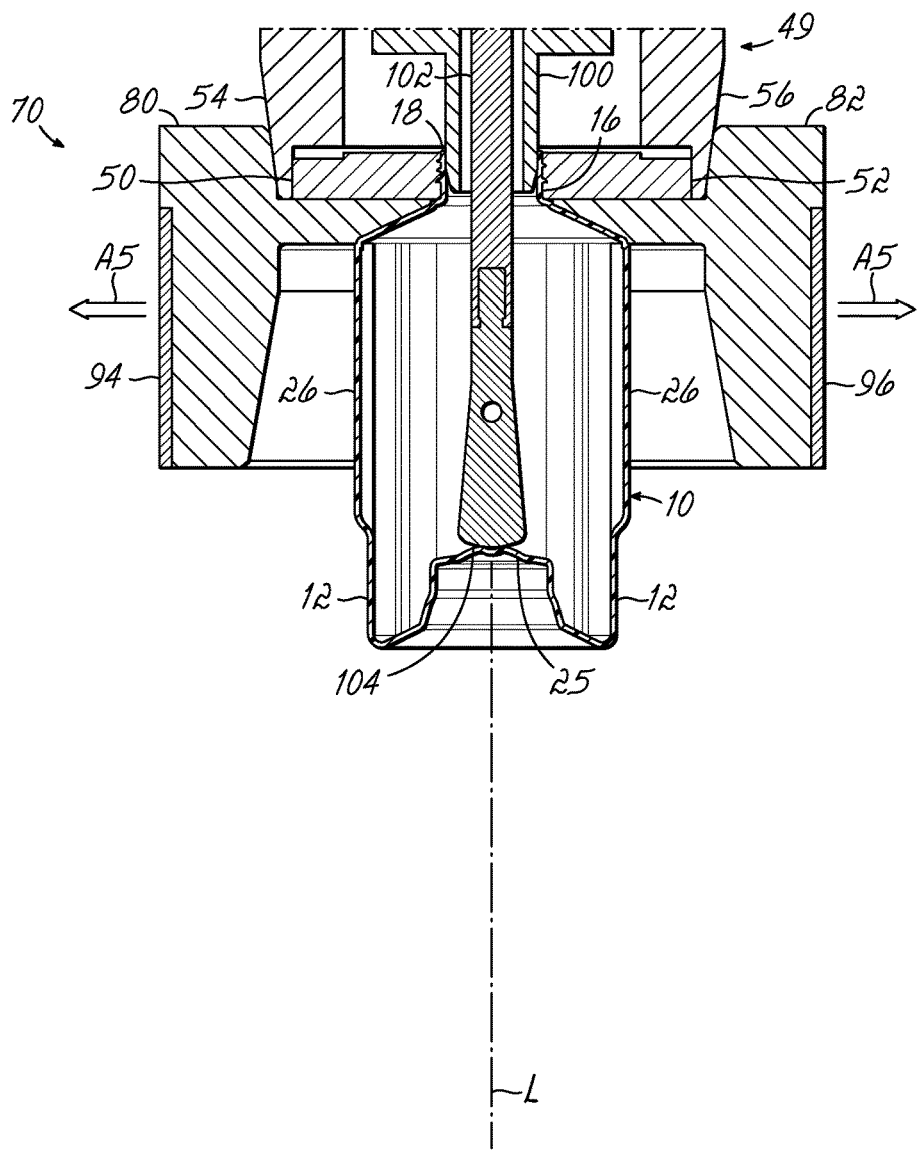
FIG. 7 is a view similar to FIG. 6, showing the bottom and side mold portions in respective ejecting positions and top mold portions being retracted during the demolding operation.
Figure 7:
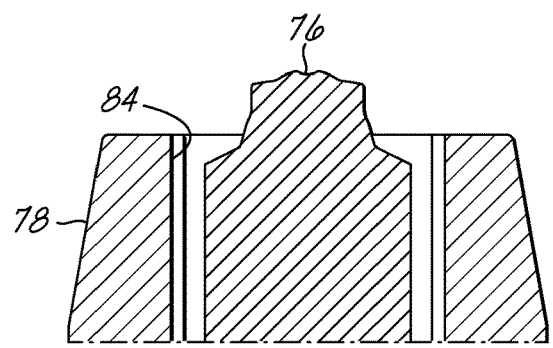
Figure 8:
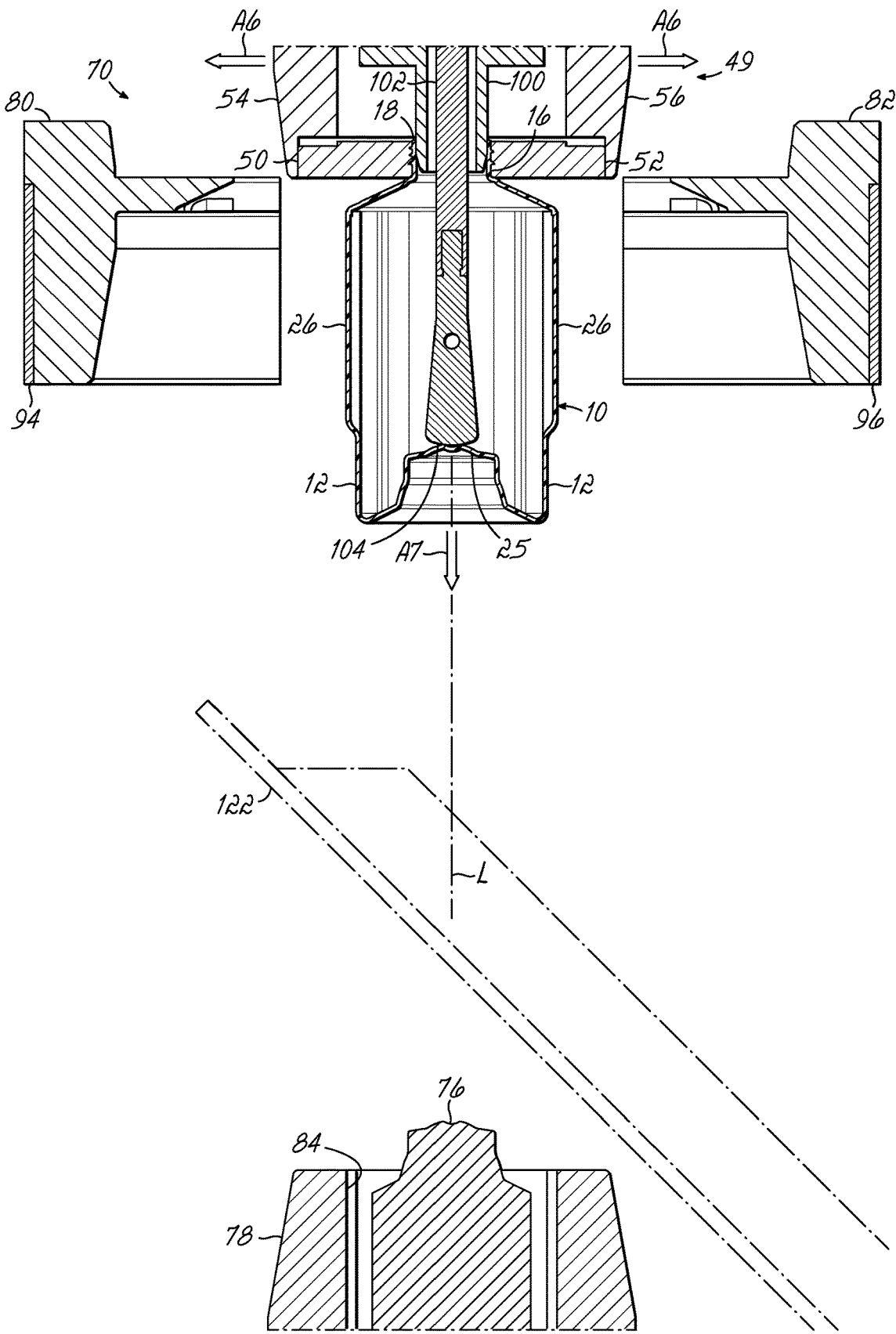
FIG. 8 is a view similar to FIG. 7, showing the bottom, side, and top mold portions in respective ejecting positions and the carrying apparatus releasing the blow molded container during the demolding operation.
Figure 9:
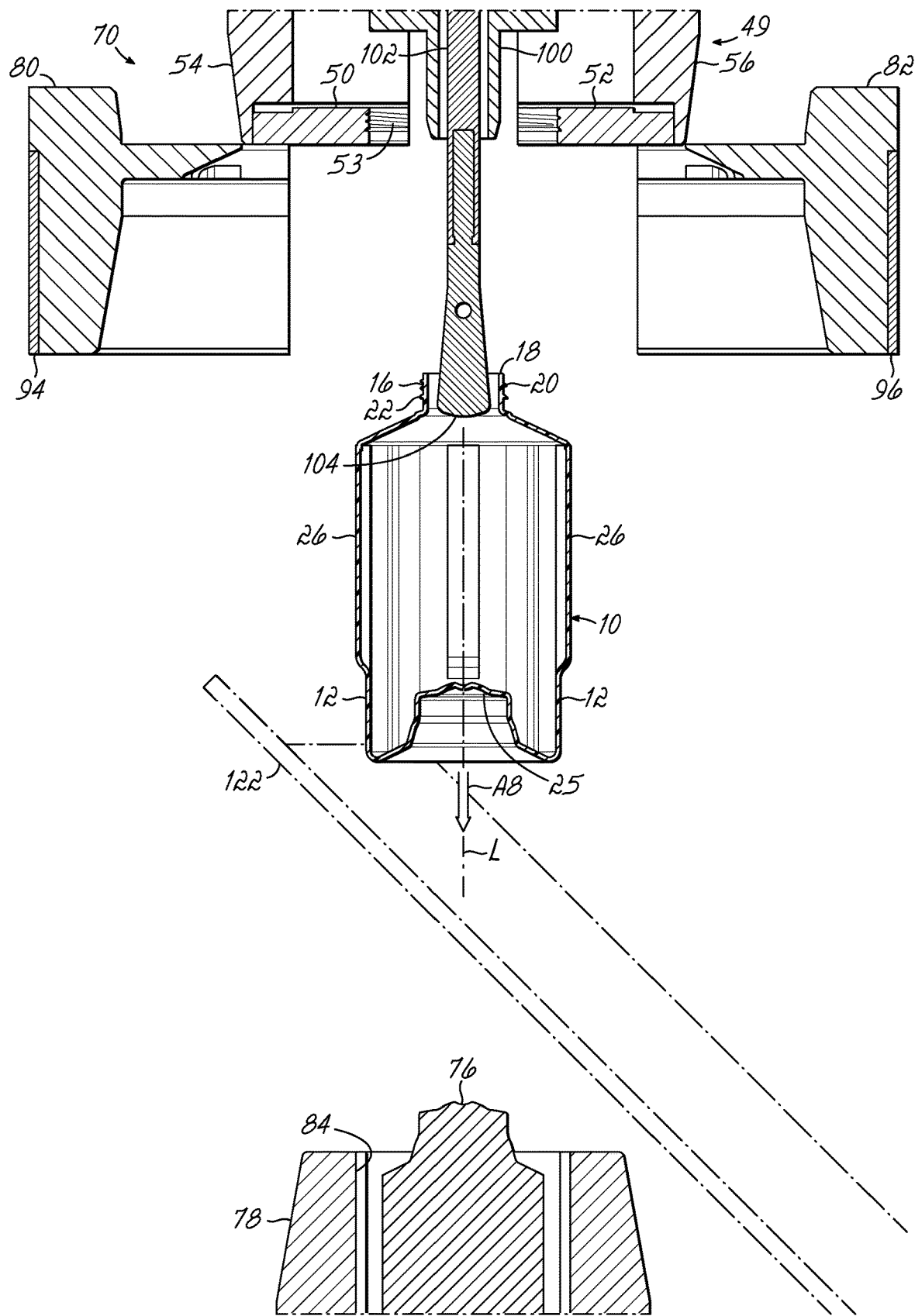
FIG. 9 is a view similar to FIG. 8, showing the container dropping to a collection ramp during the demolding operation.

With the bottom and side mold portions 76, 78 moved toward or in their respective ejecting positions, the top mold portions 80, 82 may be moved via the controller 120 and respective actuators 110 laterally away from the axis L in opposite directions, as indicated by the arrows A5 (FIG. 7). Similarly, the first and second arms 50, 52 may be moved via the controller 120 and respective actuators 110 laterally away from the axis L in opposite directions, as indicated by the arrows A6, to release the container 10 and allow the container 10 to drop, as indicated by the arrow A7 (FIG. 8). In the embodiment shown, the container 10 is dropped onto a collection ramp 122, as indicated by the arrow A8 (FIG. 9) which may direct the container 10 to a collection bin (not shown). When the container 10 has exited the blow mold station 70, the controller 120 may be configured to activate the actuators 110 to expand the respective pistons 114 in order to move the respective mold portions 76, 78, 80, 82 in directions opposite those discussed above to thereby return each of the mold portions 76, 78, 80, 82 to their respective molding positions. For example, the controller 120 may activate the actuators 110 of the mold portions 76, 78, 80, 82 simultaneously to return each of the mold portions 76, 78, 80, 82 to their respective molding positions for performing a subsequent molding operation.

In one embodiment, the actuators 110 and/or controller 120 allow for multiple, sequential, coordinated and/or timed movements of the bottom and side mold portions 76, 78 along the axis L to enable the bottom and side mold portions 76, 78 to be pulled down sequentially, in tandem, and/or discreetly. Such coordination may allow for removal of the container 10 even when configured with deeply blown undercuts 30 and/or expanded cuts 32 without deforming or destroying the container 10 due to excessive friction or other strong side-to-side connections otherwise caused by such deeply blown undercuts 30 and/or expanded cuts 32.

The controller 120 may be configured with timing software and/or hardware for coordinating activation of the various actuators 110. For example, the controller 120 may include instructions for software and a microprocessor (not shown) to execute the instructions for operating and/or synchronizing the actuators 110. In one embodiment, the controller 120 may be configured to synchronize the actuators 110 with other components and/or processes of the blow mold station 70 or blow molding procedure for fast and efficient production.

For example, there is limited time between the different blow mold process stages. Therefore, the sequential "pulls" for the various mold portions 76, 78, 80, 82 must be accomplished within the window of time allotted for the pull stage of the blow mold machine process. Coordinating and timing the activation of the actuators 110 to move the respective mold portions 76, 78, 80, 82 toward the ejecting positions efficiently within that window may allow for using the minimum amount of time required to sequentially overcome the static friction which then minimizes the overall cycle time, thereby lowering the manufacturing costs of each container 10 and increasing productivity.

In one embodiment wherein the preform heating station 42 and blow molding station 70 are integrated with a preform forming (e.g., injection molding) station for initially forming the preform 34 (not shown), carrying apparatus 49 may transport the formed preform 42 from the preform forming station to the preform heating station 42 and position the cylindrical body 36 of the preform 34 in the heating cavity 46. The core rod 57 may substantially simultaneously be lowered into the preform 34. The cylindrical body 36 of the preform 34 may be maintained within the heating cavity 46 for approximately 10 seconds. Hot air may be directed to the exterior of the preform 34 for substantially the entirety of this approximately 10 second period, with the temperature of hot air being between approximately 285° C. and approximately 310° C. and the pressurization of the hot air being approximately 20 PSI. The carrying apparatus 49 may then transport the conditioned preform 34 to the blow mold station 70 and position the cylindrical body 36 of the preform 34 in the molding cavity 74. The stretch rod 102 may be lowered to stretch the preform 34 to the bottom mold portion 76 and pressurized air may be directed into the interior of the preform 34 via the compressed gas nozzle 100 at approximately 585 PSI in order to blow mold the preform 34 into the final container 10. The container 10 may then be demolded and deposited onto the collection ramp 122.

In one embodiment, the preform forming station, preform heating station 42, and blow mold station 70 may be angularly displaced from each other by approximately 120 degrees. Thus, the carrying apparatus 49 may be configured to rotate between the stations at 120 degree intervals. In one embodiment, the preform 34 and/or container 10 may be present at each station for approximately 16.8 seconds. Thus, the total cycle time for the preform 34 to be formed, conditioned, blow molded into the final container 10, and deposited may be approximately 50.4 seconds.

Figure 10:
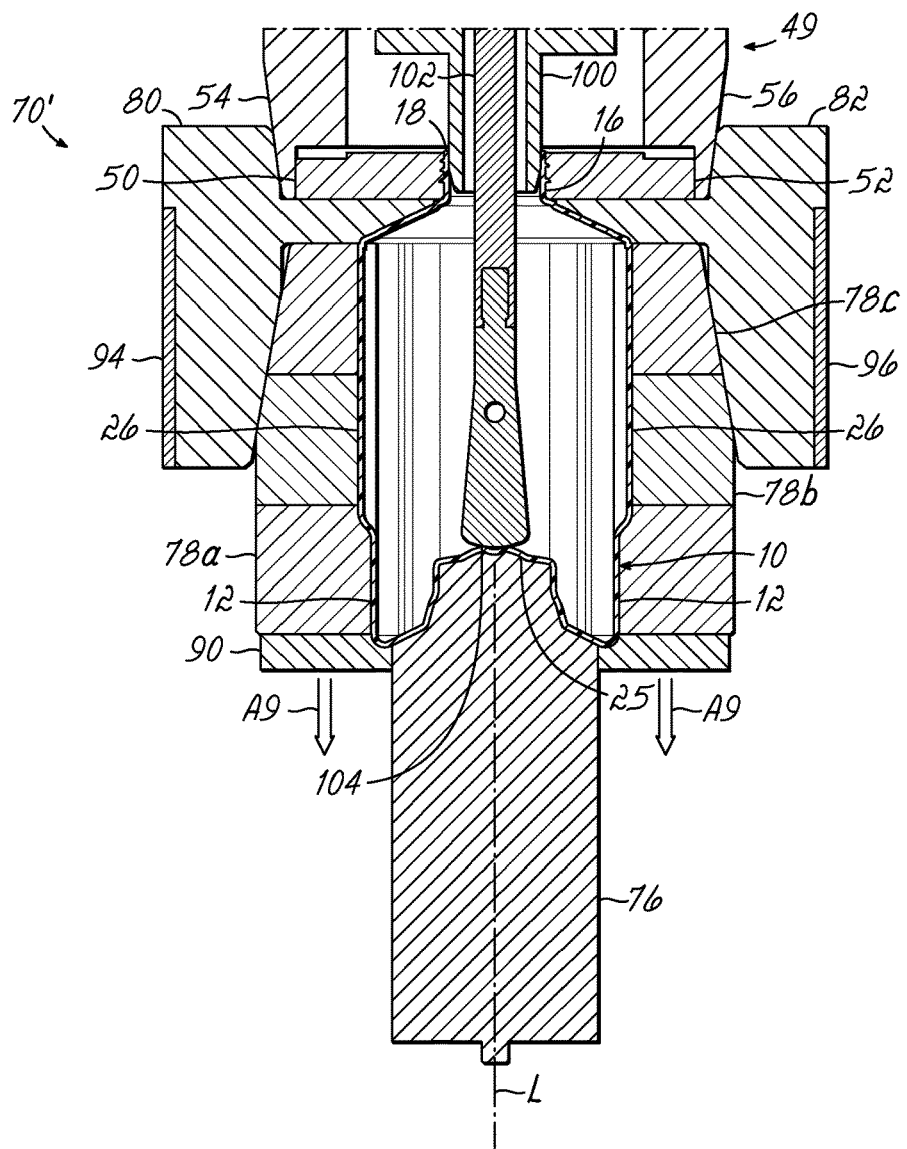
FIG. 10 is a partial cross sectional view of an alternative molding station, showing a lowermost horizontal section of a side mold portion being retracted during a demolding operation in accordance with an embodiment of the invention.
Figure 11:
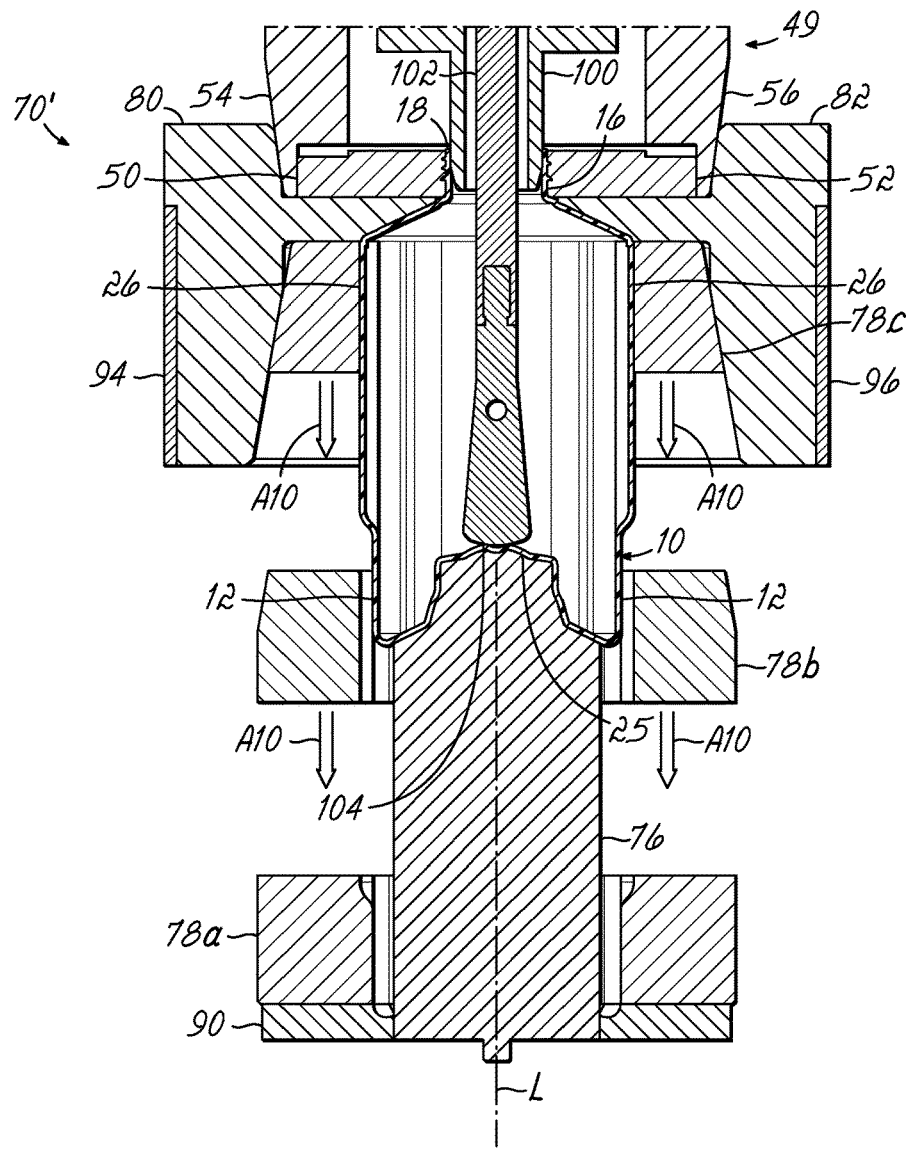
FIG. 11 is a view similar to FIG. 10, showing middle and uppermost horizontal sections of the side mold portion being retracted during the demolding operation.
Figure 12:
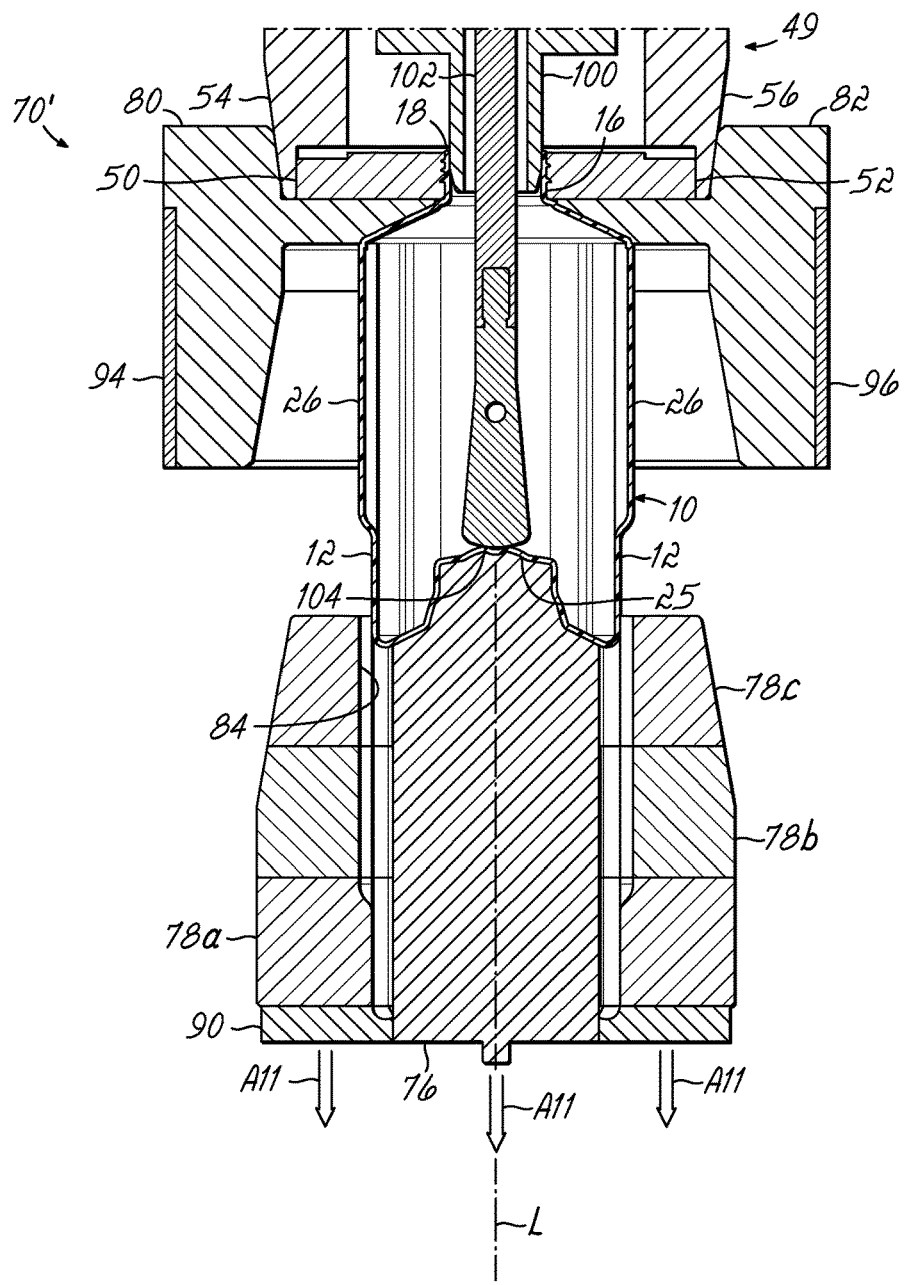
FIG. 12 is a view similar to FIG. 11, showing a bottom mold portion and the horizontal sections being retracted during the demolding operation.

Referring now to FIGS. 10-12, an alternative exemplary blow mold station 70' is provided. The blow mold station 70' of this embodiment is substantially similar to that of the previous embodiment with the primary difference being that the side mold portion is divided into three horizontal sections 78a, 78b, 78c, which are independently movable along the axis L via actuators and a controller (not shown) similar to those previously described. In this regard, the lowermost horizontal section 78a may be mounted to the side mold platform 90 and the remaining horizontal sections 78b, 78c may be mounted to separate platforms (not shown) or directly coupled to their respective actuators. In any event, the horizontal sections 78a, 78b, 78c may collectively define at least one dovetail including a tongue or a groove (not shown) extending in a direction parallel to the axis L for forming a corresponding dovetail on the container 10.

Thus, in the embodiment shown, the side mold portion is divided into horizontal sections 78a, 78b, 78c arranged in a stack along the axis L. In one embodiment, the sections 78a, 78b, 78c may be connected together using connecting mechanisms or mechanical fasteners (not shown), such as when in the respective molding positions. While three such sections 78a, 78b, 78c are shown, any suitable number may be used. For example, the number of separate horizontal sections 78a, 78b, 78c may be selected based on the amount of static friction which must be overcome and the number of sections required to overcome the static friction in a manner sufficient to avoid deforming or destroying the container 10 during the demolding process.

In one embodiment, the controller may be configured with a timed stroke sequence during the demolding process in which the horizontal sections 78a, 78b, 78c of the side mold portion are pulled down in order, from the lowermost horizontal section 78a first to the uppermost horizontal section 78c last. For example, each horizontal section 78a, 78b, 78c may remain static until the next-lower horizontal section is being pulled down. In this manner, the static upper horizontal section(s) 78b, 78c may provide support to the container 10 for a short period of time at least until the static friction is overcome between the lower horizontal section 78a and the container 10. Once the static friction between the container 10 and the lower horizontal section 78a such that the lower horizontal section 78a is moving down, as indicated by the arrows A9 (FIG. 10), the reduced kinetic friction between the moving horizontal section 78a and the container 10 is sufficiently low such that the next higher horizontal section 78b can be moved down without causing the container 10 to stretch. The upper horizontal section 78c may assist in supporting the container 10 as the lower horizontal sections 78a, 78b are moving down, thus allowing the overall friction on the container 10 to be reduced by a factor corresponding to the number of horizontal sections 78a, 78b, 78c. In the illustrated embodiment having three horizontal sections 78a, 78b, 78c, the initial friction present between the first moving (e.g., lowest) horizontal section 78a and the container 10 may be only approximately one-third of the friction that would otherwise be present between the container 10 and the entire side mold portion 78.

Once the static friction is overcome on the lower horizontal section(s) 78a, 78b, the remaining kinetic friction caused by the lower moving horizontal section(s) 78a, 78b is reduced, such that the container 10 is not deformed or destroyed by the demolding process. One-by-one the horizontal sections 78a, 78b, 78c can be moved down after the static friction is overcome on each, as indicated by the arrows A10 (FIG. 11), and the remaining kinetic friction on the horizontal sections 78a, 78b, 78c that are moving down to release the container 10 may be insufficient to deform or destroy the container 10. Thus, the exemplary blow mold station 70' may prevent the container 10 from stretching and/or being pulled apart into separate pieces during the demolding process.

In the embodiment shown, the bottom mold portion 76 is independently movable in a manner similar to that of the previous embodiment. Thus, the controller may be configured to pull down the bottom mold portion 76 after the side mold portion (e.g., each of the horizontal sections 78a, 78b, 78c) has been at least partially pulled down in a manner similar to that of the previous embodiment, as indicated by the arrows A11 (FIG. 12), in order to support the container 10 during the demolding process. In another embodiment, the controller may be configured to pull down the bottom mold portion 76 simultaneously with one or more of the horizontal sections 78a, 78b, 78c of the side mold portion. For example, the controller may be configured to pull down the bottom mold portion 76 simultaneously with the lowermost horizontal section 78a of the side mold portion. In one embodiment, the bottom mold portion 76 may be integrally formed with the lowermost horizontal section 78a of the side mold portion as a unitary piece.

The remaining features and benefits of the blow mold station 70' are substantially similar to those of the blow mold station 70 and will be readily understood, and thus are not repeated for the sake of brevity.

Figure 13:
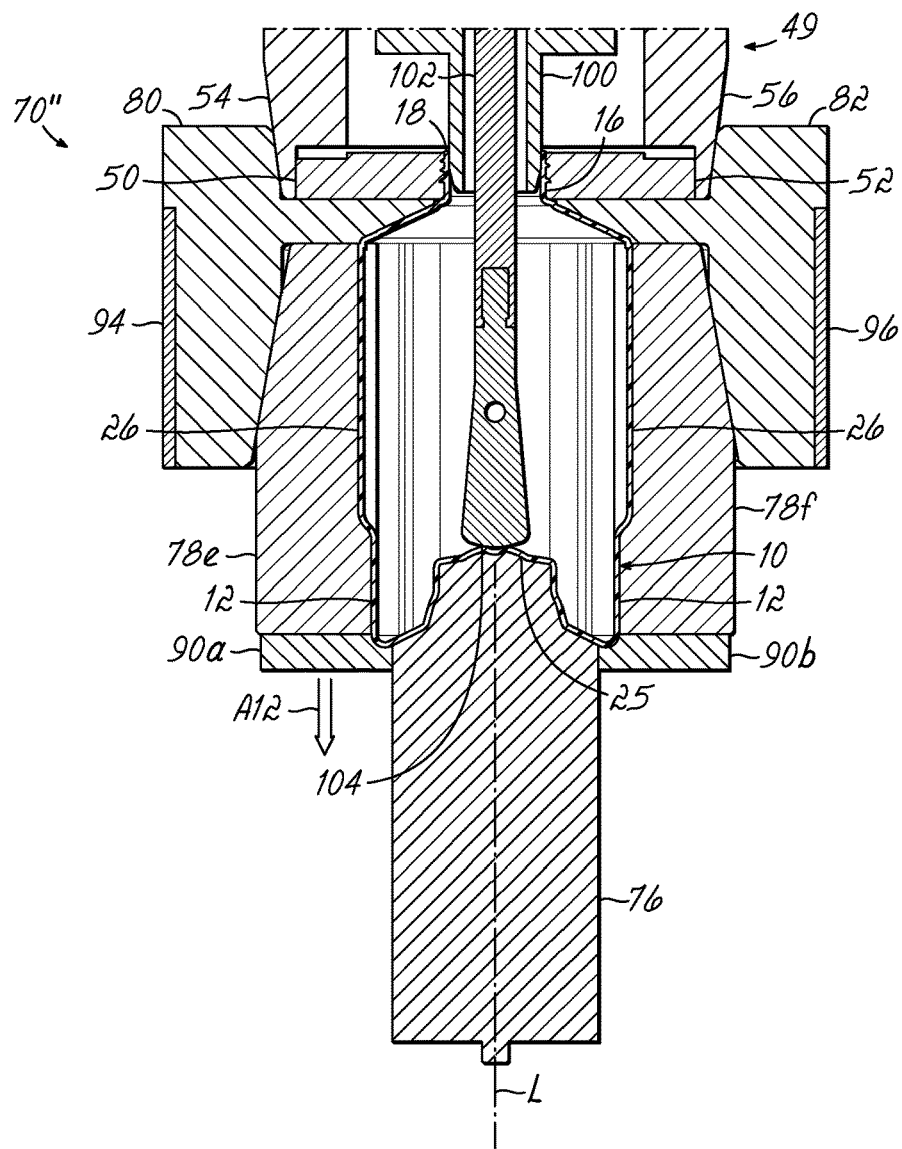
FIG. 13 is a partial cross sectional view of an alternative molding station, showing a first vertical section of a side mold portion being retracted during a demolding operation in accordance with an embodiment of the invention.
Figure 14:
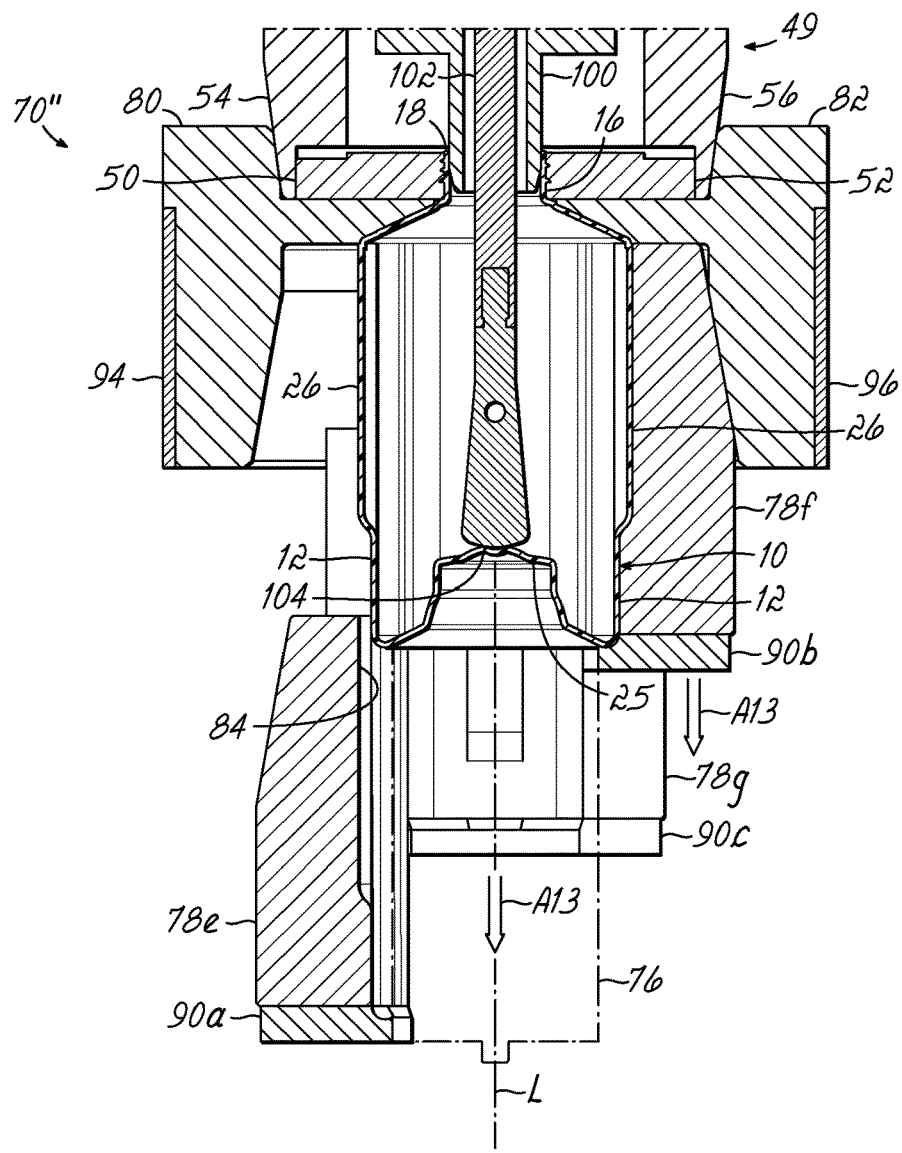
FIG. 14 is a view similar to FIG. 13, showing second and third vertical sections of the side mold portion being retracted during the demolding operation.
Figure 15:
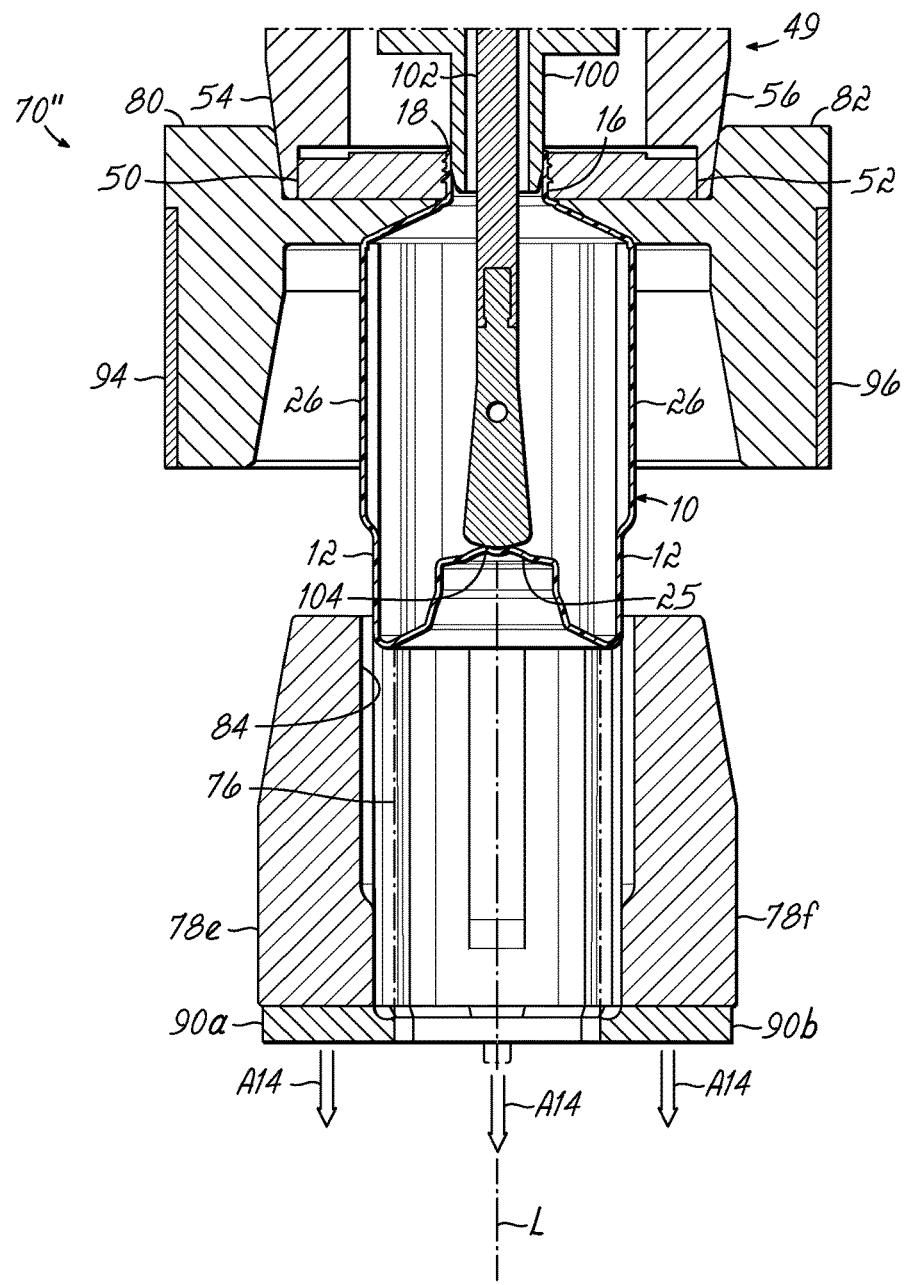
FIG. 15 is a view similar to FIG. 14, showing a bottom mold portion and the vertical sections being retracted during the demolding operation.

Referring now to FIGS. 13-15, an alternative exemplary blow mold station 70" is provided. The blow mold station 70" of this embodiment is substantially similar to that of the previous embodiments with the primary difference being that the side mold portion is divided into four vertical sections 78e, 78f, 78g (three shown), which are independently movable in a direction parallel to the axis L via actuators and a controller (not shown) similar to those previously described. In this regard, each of the vertical sections 78e, 78f, 78g may be mounted on a respective dedicated platform 90a, 90b, 90c. At least one of the vertical sections 78e, 78f, 78g may define at least one dovetail including a tongue or a groove (not shown) extending in a direction parallel to the axis L for forming a corresponding dovetail on the container 10.

Thus, in the embodiment shown, the side mold portion is divided into vertical sections 78e, 78f, 78g arranged side-to-side about the axis L. In one embodiment, the sections 78e, 78f, 78g may be connected together using connecting mechanisms or mechanical fasteners (not shown), such as when in the respective molding positions. While four such sections 78e, 78f, 78g are present in the illustrated embodiment, any suitable number may be used. For example, the number of separate vertical sections 78e, 78f, 78g may be selected based on the amount of static friction which must be overcome and the number of sections required to overcome the static friction in a manner sufficient to avoid deforming or destroying the container 10 during the demolding process.

In one embodiment, the controller may be configured with a timed stroke sequence during the demolding process in which the vertical sections 78e, 78f, 78g of the side mold portion are pulled down in order, beginning with one or more vertical sections 78e, 78f, 78g and continuing sequentially with the remaining vertical sections 78e, 78f, 78g. In this manner, the static vertical sections 78e, 78f, 78g may provide support to the container 10 for a short period of time at least until the static friction is overcome by the moving vertical sections 78e, 78f, 78g. Once the static friction is overcome on at least one vertical section 78e such that the at least one vertical section 78e, 78f, 78g is moving down, as indicated by the arrow A12 (FIG. 13), the reduced kinetic friction between the moving vertical section 78e and the container 10 is sufficiently low such that one or more of the other vertical sections 78f, 78g can be moved down without causing the container 10 to stretch. The static vertical sections 78e, 78f, 78g may assist in supporting the container as the other vertical portions 78e, 78f, 78g are moving down, thus allowing the overall friction on the container 10 to be reduced by a factor corresponding to the number of vertical sections 78e, 78f, 78g. In the illustrated embodiment having four vertical sections 78e, 78f, 78g, the initial friction present between the first moving vertical section 78e and the container 10 may be approximately one-fourth of the friction that would otherwise be present between the container 10 and the entire side mold portion 78.

Once the static friction is overcome on the first vertical section 78e, the remaining kinetic friction caused by the moving vertical section 78e is reduced such that the container 10 is not deformed or destroyed by the demolding process. One-by-one the vertical sections 78e, 78f, 78g can be moved down after the static friction is overcome on each, as indicated by the arrows A13 (FIG. 14), and the remaining kinetic friction on the vertical sections 78e, 78f, 78g that are moving down to release the container may be insufficient to deform or destroy the container 10. Thus, the exemplary blow mold station 70" may prevent the container 10 from stretching and/or being pulled apart into separate pieces during the demolding process.

In the embodiment shown, the bottom mold portion 76 is independently movable in a manner similar to that of the previous embodiment. Thus, the controller may be configured to pull down the bottom mold portion 76 after the side mold portion (e.g., each of the vertical sections 78e, 78f, 78g) has been at least partially pulled down in a manner similar to that of the previous embodiment, as indicated by the arrows A14 (FIG. 15), in order to support the container 10 during the demolding process). In another embodiment, the controller may be configured to pull down the bottom mold portion 76 simultaneously with one or more of the vertical sections 78e, 78f, 78g of the side mold portion. In one embodiment, the bottom mold portion 76 may be integrally formed with any of the vertical sections 78e, 78f, 78g of the side mold portion as a unitary piece.

The remaining features and benefits of the blow mold station 70" are substantially similar to those of the blow mold station 70 and will be readily understood, and thus are not repeated for the sake of brevity.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A system for molding an object, comprising:
an articulated mold having an axis and including a plurality of mold portions configured to collectively define a molding cavity for shaping the object when arranged in respective molding positions, wherein the plurality of mold portions includes at least a first mold portion and a second mold portion;
a plurality of actuators, wherein each of the plurality of actuators is operatively coupled to a respective mold portion of the plurality of mold portions and configured to move the respective mold portion along and parallel to the axis from the respective molding position toward a respective ejecting position for releasing the object; and
a controller in communication with each of the plurality of actuators and configured to independently activate each of the plurality of actuators such that one of the plurality of mold portions moves along and parallel to the axis from the respective molding position toward the respective ejecting position while at least one other of the plurality of mold portions remains stationary relative to the object in order to at least partially support the object and wherein the controller is configured to move the first mold portion along and parallel to the axis toward the second mold portion from the respective molding position toward the respective ejecting position.

2. The system of claim 1, wherein the molding cavity includes at least one of a tongue or a groove extending in a direction parallel to the axis.

3. The system of claim 1, wherein the plurality of actuators are configured to move the respective mold portions along the axis from the respective molding positions toward the respective ejecting positions in a same direction.

4. The system of claim 1, wherein the controller is configured to activate each of the plurality of actuators sequentially.

5. The system of claim 4, wherein the plurality of mold portions includes a bottom portion and at least one side portion distributed along the axis.

6. The system of claim 5, wherein the at least one side portion is configured to move along the axis from the respective molding position toward the respective ejecting position prior to the bottom portion moving along the axis from the respective molding position toward the respective ejecting position such that the bottom portion supports the object during movement of the at least one side portion.

7. The system of claim 4, wherein the plurality of mold portions includes an upper side portion and a lower side portion distributed along the axis.

8. The system of claim 7, wherein the lower side portion is configured to move along the axis from the respective molding position toward the respective ejecting position prior to the upper side portion moving along the axis from the respective molding position toward the respective ejecting position such that the upper side portion supports the object during movement of the lower side portion.

9. The system of claim 4, wherein the plurality of mold portions includes first and second side-by-side portions distributed about the axis.

10. The system of claim 9, wherein the first side-by-side portion is configured to move along the axis from the respective molding position toward the respective ejecting position prior to the second side-by-side portion moving along the axis from the respective molding position toward the respective ejecting position such that the second side-by-side portion supports the object during movement of the first side-by-side portion.

* * * * *